(12) United States Patent
Li et al.

(10) Patent No.: US 8,478,350 B2
(45) Date of Patent: Jul. 2, 2013

(54) DISTRIBUTION METHOD, OPERATION METHOD AND SYSTEM OF APPLICATION SYSTEM IN MOBILE COMMUNICATION NETWORK

(75) Inventors: Jun Li, Beijing (CN); Bibo Qin, Beijing (CN); Hong Xie, Beijing (CN); Ming Gao, Beijing (CN)

(73) Assignee: Beijing Chnfuture Information Technology Co., Ltd., Beijing (CN)

( * ) Notice: Subject to any disclaimer, the term of this patent is extended or adjusted under 35 U.S.C. 154(b) by 409 days.

(21) Appl. No.: 12/810,515

(22) PCT Filed: May 23, 2008

(86) PCT No.: PCT/CN2008/001004
§ 371 (c)(1),
(2), (4) Date: Jun. 25, 2010

(87) PCT Pub. No.: WO2009/082872
PCT Pub. Date: Jul. 9, 2009

(65) Prior Publication Data
US 2010/0279678 A1 Nov. 4, 2010

(30) Foreign Application Priority Data
Dec. 26, 2007 (CN) .......................... 2007 1 0303874

(51) Int. Cl.
*H04W 40/00* (2009.01)
(52) U.S. Cl.
USPC ...................................... 455/566; 455/422.1

(58) Field of Classification Search
USPC .......... 455/412.1–412.2, 414.1–414.4, 422.1, 455/466, 550.1, 555, 556.1–556.2, 566; 705/40–44
See application file for complete search history.

(56) References Cited

U.S. PATENT DOCUMENTS

2003/0074313 A1* 4/2003 McConnell et al. ............ 705/40
2005/0070262 A1* 3/2005 Weigand ....................... 455/418

* cited by examiner

*Primary Examiner* — Kashif Siddiqui
(74) *Attorney, Agent, or Firm* — CKC & Partners Co., Ltd.

(57) ABSTRACT

A distribution method and an operation method and system of application system in mobile communication network are disclosed. The methods are adapted to mobile information field, which include: a mobile communication terminal establishes connection with an application system distribution platform through a mobile communication network; the mobile communication terminal uses the application system by an application system human-computer interaction module installed on the application system distribution platform; the application system and the human-computer interaction module run; an output process module of the application system distribution platform obtains a screen display image data of the human-computer interaction module, and sends it to the mobile communication terminal; the mobile communication terminal displays the screen display image of the human-computer interaction module, and sends an input information to the human-computer interaction module; step C and step E are repeated until the mobile communication terminal exit from the operation of the application system. The present invention can make an application system distributed on a mobile communication terminal, therefore, the network requirement is little, and the experience of the user is high.

52 Claims, 24 Drawing Sheets

DISTRIBUTION METHOD, OPERATION METHOD AND SYSTEM OF APPLICATION SYSTEM IN MOBILE COMMUNICATION NETWORK

RELATED APPLICATIONS

This application is a co-pending application, which claims priority to PCT Application No. PCT/CN2008/001004 filed May 23, 2008, which are herein incorporated by reference.

BACKGROUND

1. Field of Invention

The present invention relates generally to an application system mobility and, more particularly, to a distribution method, operating method and system for using in an application system of a mobile communication network.

2. Description of Related Art

Owing to the increasingly sophisticated mobile communication technology, the demand of people for mobility has grown with each passing day. People want to access the Internet with high speed during the process of moving or login a developed application system so that they can obtain the information they need at all time and finish whatever they want to do.

However, when we want to distribute the information in the application system to the mobile communication terminal at the present day, we have to transform the IT application system in the fixed-line into the mobile application due to the difference between the mobile communication network and the Internet.

WAP technology nowadays can connect the mobile communication terminal with the application system, but the mobile communication terminal nowadays has a lower speed due to the lower bandwidth of the mobile communication link so that some applications which need larger network traffic can't apply to the mobile communication terminal.

Moreover, the mobile communication terminal usually doesn't have powerful processing capability so that the performance of the mobile communication terminal is instable. WAP architecture compared to WWW architecture reduces the workload of the mobile communication terminal, but the mobile communication terminal still has to take part of the application computing task. The application computing task is different for different applications, which results in the instable performance of the mobile communication terminal.

Furthermore, WAP has a loss of function due to the simplification of WAP architecture compared to WWW architecture so that the application of WAP has less function than the application of WWW.

An interface of a mobile phone becomes very simple as a result of an effect of the communication speed and the mobile phone performance to affect the convenience of the mobile phone extremely. To transplant the function of the PC to the mobile phone is extremely difficult, the applications according to the PC are almost impossible to transplant to the mobile communication terminal. If we want to transplant the function of the PC to the mobile communication terminal, there must be a complex developing transformation work. To each application, there must be a single transplantation so that the commonality is poor. The mobile communication terminal is a terminal that uses in extremely complex and variable application environments so that the security risk of the application and information distributed to the mobile phone increases. The user of the mobile communication terminal has great uncertainty. The user authentication process, the user authorization process, and auditing function all depend on the function of application itself. We can't take any powerful security measures to the kind of access and terminal of the mobile communication terminal access having high risks.

SUMMARY

The present invention provides a distribution method, operating method and system for using in an application system of a mobile communication network. The distribution method comprises:

(a) establishing a connection between a mobile communication terminal and an application system distribution platform through the mobile communication network;

(b) accessing a corresponding application system by activating an application system human-computer interaction module installed on the application system distribution platform;

(c) operating the application system and the human-computer interaction module;

(d) obtaining a screen display image interface of the human-computer interaction module by an output processing module of the application system distribution platform and sending the screen display image interface to the mobile communication terminal;

(e) displaying the screen display image interface by the mobile communication terminal and sending input information in the mobile communication terminal to the human-computer interaction module; and (f) repeating the step (c) through step (e) until the mobile communication terminal quitting the operation of the application system.

In another aspect, the present invention provides an application system distribution system for using in a mobile communication network, where the mobile communication network comprises a mobile communication terminal, a base station and a mobile communication switching center, and the system comprises a mobile communication terminal, an application system distribution platform, and an application system. The mobile communication terminal establishes a connection with the application system distribution platform through the mobile communication network.

The mobile communication terminal comprises a virtual agent module, and the application system distribution platform comprises a virtual channel module, an output processing module, an input processing module, and a human-computer interaction module.

The output processing module is connected to the virtual channel module and the human-computer interaction module respectively for obtaining a screen display image interface of the human-computer interaction module and sending the screen display image interface to the virtual channel module.

The input processing module is connected to the virtual channel module and the human-computer interaction module respectively for processing an input information obtained from the virtual channel module and transmitting to the human-computer interaction module.

A virtual channel is established between the virtual agent module and the virtual channel module for sending the screen display image interface of the human-computer interaction module and the input information in the mobile communication terminal inputted by the user.

The human-computer interaction module is connected to the application system, and the mobile communication terminal accesses the corresponding application system by activating the human-computer interaction module and operates the application system.

In yet another aspect, the present invention provides an operating method for application system distribution. The operating method is used in different aspects comprising a mobile communication terminal user and a mobile communication service network of a mobile communication operator, and the operating method comprises:

(a) establishing a connection between the mobile communication terminal user and the an application system distribution platform through the mobile communication operator;

(b) accessing a corresponding application system by activating an application system human-computer interaction module installed on the application system distribution platform;

(c) operating the application system and the human-computer interaction module;

(d) obtaining a screen display image interface of the human-computer interaction module by an output processing module of the application system distribution platform and sending the screen display image interface to the mobile communication terminal;

(e) displaying the screen display image interface of the human-computer interaction module by the mobile communication terminal and sending input information of a user to the human-computer interaction module.

In still another aspect, the present invention provides an operating system of an application system distribution. The operating system of an application system distribution comprises a mobile communication terminal, an application system distribution platform, an application system, and an operating device.

The operating device is a mobile communication service network of a mobile communication operator, which comprises a base station and a mobile communication switching center, and the mobile communication terminal establishes a connection with the application system distribution platform through the operating device The mobile communication terminal comprises a virtual agent module, and the application system distribution platform comprises a virtual channel module, an output processing module, an input processing module and a human-computer interaction module.

The output processing module is connected to the virtual channel module and the human-computer interaction module respectively for obtaining a screen display image interface of the human-computer interaction module and sending the screen display image interface to the virtual channel module.

The input processing module is connected to the virtual channel module and the human-computer interaction module respectively for processing an input information obtained from the virtual channel module and transmitting to the human-computer interaction module.

A virtual channel is established between the virtual agent module and the virtual channel module for sending the screen display image interface of the human-computer interaction module and/or the input information of the user through the operating device The human-computer interaction module is connected to the application system, and the mobile communication terminal accesses the corresponding application system by activating the human-computer interaction module and operates the application system.

The present invention provides virtualization technology without installing the application system in the mobile communication terminal and installing software in the application system distribution platform to make the interface become abstraction so that the mobile communication terminal having lower processing ability accesses a single application through mobile communication network having low bandwidth. A seamless application interface transmission brings the user more intuitional experience.

In the meantime the present invention provides the interface of the mobile communication terminal adapted to display on a smaller mobile communication terminal screen and answer the viewing habits of the user so that the distribution content of the application system is applicable.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
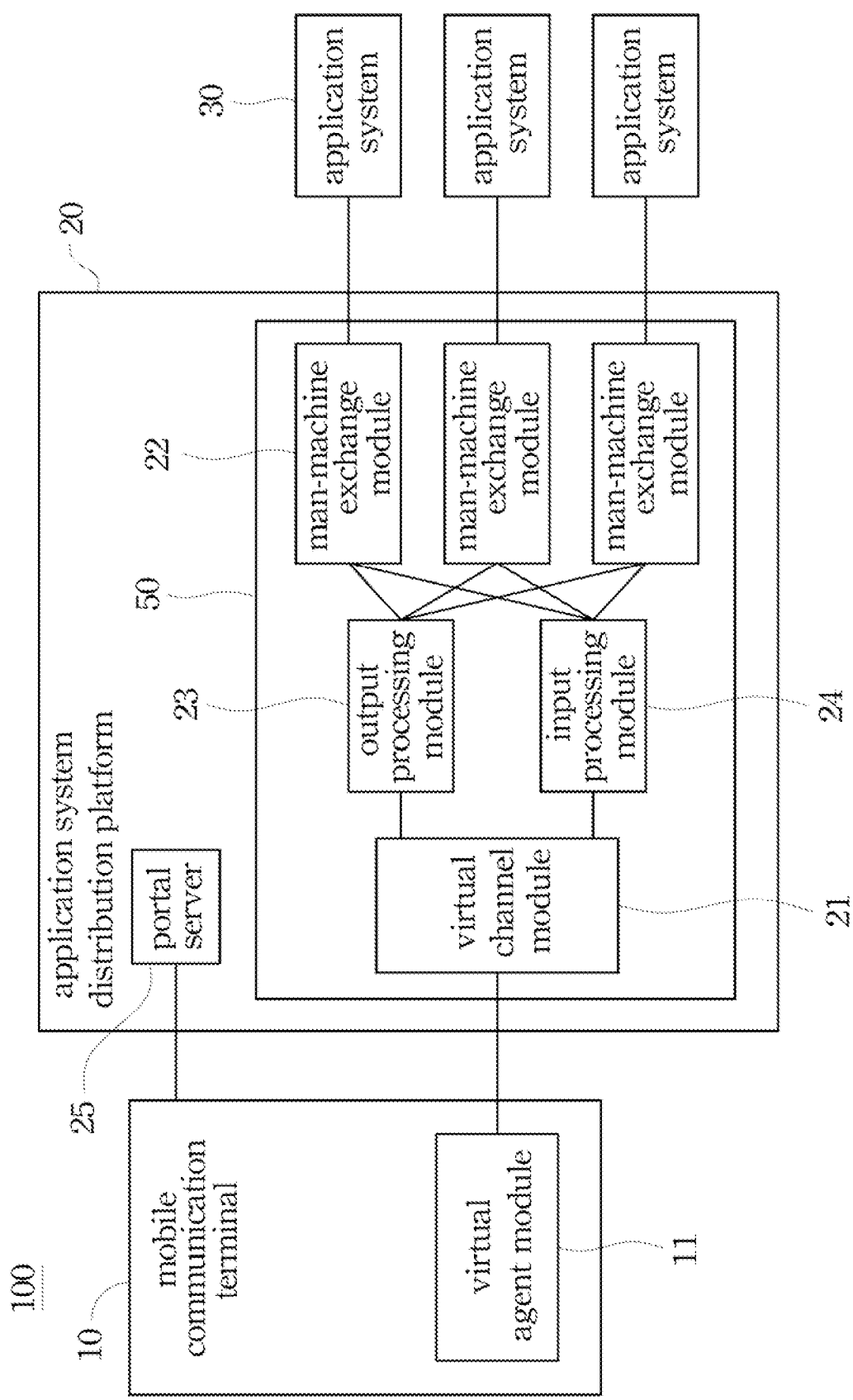
FIG. 1 shows schematically a structure of an application system distribution system according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

(1) Overview

The present invention provides an application system distribution system for distributing a variety of IT application systems to a mobile communication terminal through a mobile communication network and, more particularly, to an mobile communication terminal which can receive distribution service through wireless communication technology, such as a smart mobile phone, personal digital assistant, vehicle terminal or a computer having a wireless mobile communication accessing module. That is to say, a user can use a variety of IT application systems through mobile communication terminal at all time so as to achieve the goal of mobility of the IT application system. The present invention applies to distribute a variety of IT application systems comprising C/S(Client/Server) architecture, B/S (Browser/Server) architecture, stand-alone architecture, and so on.

The present invention provides an application system distribution platform between the application system and the mobile communication terminal. A human-computer interaction module and information of the application system operate and process entirely in the application system distribution platform. The application system distribution platform just sends the operating interface to the mobile communication terminal by way of screen refreshing, and the mobile communication terminal also merely sends input information such as a keyboard/mouse instruction or a voice to the application system distribution platform without practical operating.

FIG. 1 shows schematically a structure of an application system distribution system according to one embodiment of the present invention.

The application system distribution system 100 mainly comprises a mobile communication terminal 10, an application system distribution platform 20, and an application system 30. A communication network connects the mobile communication terminal 10 with the application system distribution platform 20 and connects the application system distribution platform 20 with the application system 30. Generally, the demand of the network quality between the application system distribution platform 20 and the application system 30 is higher, and the demand of the network quality between the application system distribution platform 20 and the mobile communication terminal 10 is lower due to only sending a screen display image information and terminal input information to each other.

The application system 30 comprises a variety of management information systems such as OA, a human resource system and a monitoring system; a variety of business systems such as ERP, CRM, a financial system, an inventory management system and a production scheduling system; a variety of business systems in financial enterprises such as an operating system, a billing system, a settlement system and an Internet banking system; a variety of support systems in telecommunication companies such as BSS, OSS and a system management; a variety of external operating systems of the operators; other types of the IT application system of state agencies, an enterprise units and social groups; a user-oriented IT application system.

The application system distribution platform 20 is composed of a portal server 25 and a distribution server 50. The application system distribution platform 20 can be installed on one or more servers, and the servers can use Windows 2000 or Windows 2003 as their operating system.

The distribution server 50 comprises a virtual channel module 21, a human-computer interaction module 22, an output processing module 23, and an input processing module 24. Distribution software is composed of the virtual channel module 21, the output processing module 23, and the input processing module 24.

The human-computer interaction module 22 is used to achieve the information exchange function between the mobile communication terminal 10 and the distributed application system 30. The human-computer interaction module 22 can be a user terminal of the C/S architecture application system or a browser of B/S architecture application system. For a stand-alone architecture application system, the human-computer interaction module 22 is the application system itself. For other types of the application system, the human-computer interaction module 22 is used as the part of human-computer interaction in the application system. Each human-computer interaction module 22 is connected to the corresponding application system 30 through the network for performing an exchange operating with the application system 30 according to the input information of the mobile communication terminal 10, and sending the output information generated from the exchange operating to the mobile communication terminal 10. The application system distribution platform 20 can be equipped with many human-computer interaction modules 22 simultaneously for distributing to many application systems 30. For example, the application system 30 can be an exchange server of Outlook, and the human-computer interaction modules 22 can be the user terminal of Outlook in the C/S architecture. In the B/S architecture, the application system 30 can be WEB server and the web page distributed from WEB server, and the human-computer interaction modules 22 can be IE browser.

The distributed application system needs to satisfy concurrent access from many mobile communication terminals to the platform. The distribution platform 20 has the ability to support multiple users, and hardware architecture and the operating system of the distribution platform server may be a multi-user support system such as a PC server using X86 architecture selecting Windows 2000/2003 as the operating system. For an unusual Unix user terminal, the software of the distribution platform can operate in a mini-range computer and Unix operating system and distribute Unix as the application system of the user terminal. For those user terminals which don't have the multi-user support, the distribution platform 20 can uses isolation technology to distribute each actual example of the user terminal to an entirely closed operating environment for concurrent operating in the same server.

The output processing module 23 is connected to the human-computer interaction module 22 and the virtual channel module 21 for obtaining a screen display image interface of the human-computer interaction module 22 and performing an output processing to output the processed screen display image interface to the virtual channel module 21. The output processing comprises a structured handling and a compressing process.

The input processing module 24 is connected to the human-computer interaction module 22 and the virtual channel module 21 for transforming input information sent from the mobile communication terminal 10 into an analog input of a keyboard and a mouse of a local user and providing to the human-computer interaction module 22.

The virtual channel module 21 is used for establishing a virtual channel with the mobile communication terminal 10 to send the input information of the mobile communication terminal 10 and the screen display image interface of the human-computer interaction module 22.

In the practical system, the number of every module in the distribution platform 20 is not limited. The modules can be installed according to the demand, and the modules can be disposed respectively or combined disposed in one or more servers The portal server 25 is a group of servers, which is equipped with portal server software of the platform. The portal server 25 is usually disposed in one or a group of servers.

The application system distribution platform 20 further comprises other conventional module used in existing technology such as a storage module (not shown, in the drawing) for storing user names, passwords, authorities, parameters set in platforms, parameters set in human-computer interaction modules, and other information. Furthermore, a management module (not shown in the drawing) accomplishes the management function of the platform.

There is a virtual agent module 11 installed in the mobile communication terminal 10 for establishing a connection with the virtual channel module 21 to establish a virtual channel. The virtual agent module 11 is also used for processing information received from the virtual channel, transforming the information into a screen display image to display on a screen of the mobile communication terminal 10, and collecting input information of the user. The virtual agent module 11 is suitable for any application system 30.

Figure 2:
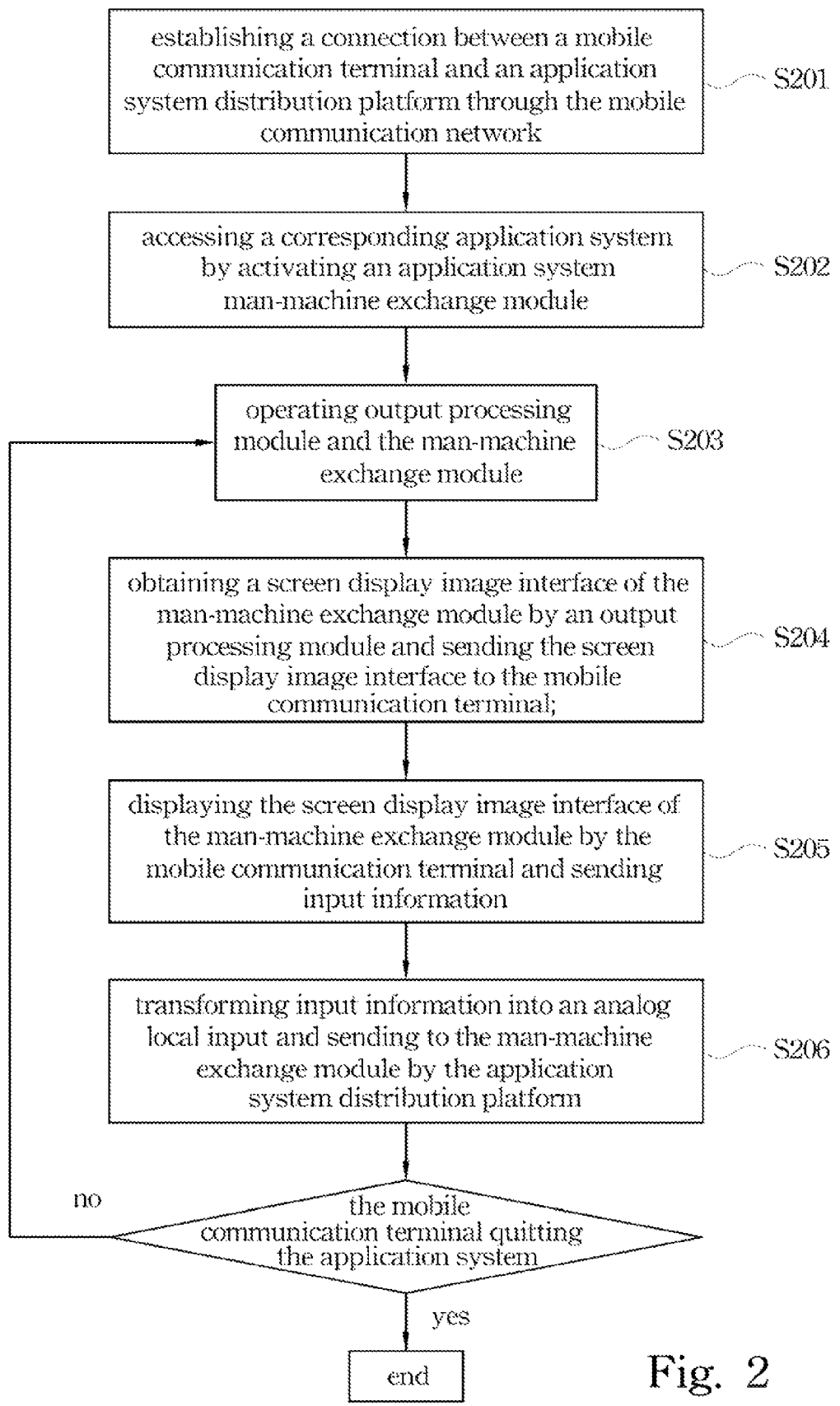
FIG. 2 shows schematically an integrated distribution flowchart of an application system according to one embodiment of the present invention.

The mobile communication terminal 10 is connected to the application system distribution platform 20 through the mobile communication network. The mobile communication network comprises a base station and a mobile communication switching center as commonly used in the existing technology. The application system distribution platform 20 is connected to the application system 30 through the mobile communication network or fixed-line. FIG. 2 shows schematically an integrated distribution flowchart of an application system according to one embodiment of the present invention. The integrated distribution flowchart comprises the steps of:

Step 201: establishing a connection between a mobile communication terminal 10 and an application system distribution platform 20 through the mobile communication network;

Step 202: accessing a corresponding application system 30 by activating an application system human-computer interaction module 22 installed on the to application system distribution platform 20;

Step 203: operating output processing module 23 and the human-computer interaction module 22;

Step 204: obtaining a screen display image interface of the human-computer interaction module 22 by an output processing module 23 of the application system distribution platform 20 and sending the screen display image interface to the mobile communication terminal 10;

Step 205: displaying the screen display image interface of the human-computer interaction module 22 by the mobile communication terminal 10, keying in input information by a user according to the screen display image interface, and sending input information to the application system distribution platform 20 by the mobile communication terminal 10;

Step 206: transforming input information into an analog local input and sending it to the human-computer interaction module 22 by the application system distribution platform 20, and performing the step 203 until the mobile communication terminal 10 quitting the operation of the application system 30.

In one embodiment of the present invention, a user can wirelessly connect with the application system distribution platform 20 through a mobile communication terminal such as a mobile phone, a personal digital assistant, a vehicle terminal, or a computer having a wireless mobile communication accessing module.

Figure 3:
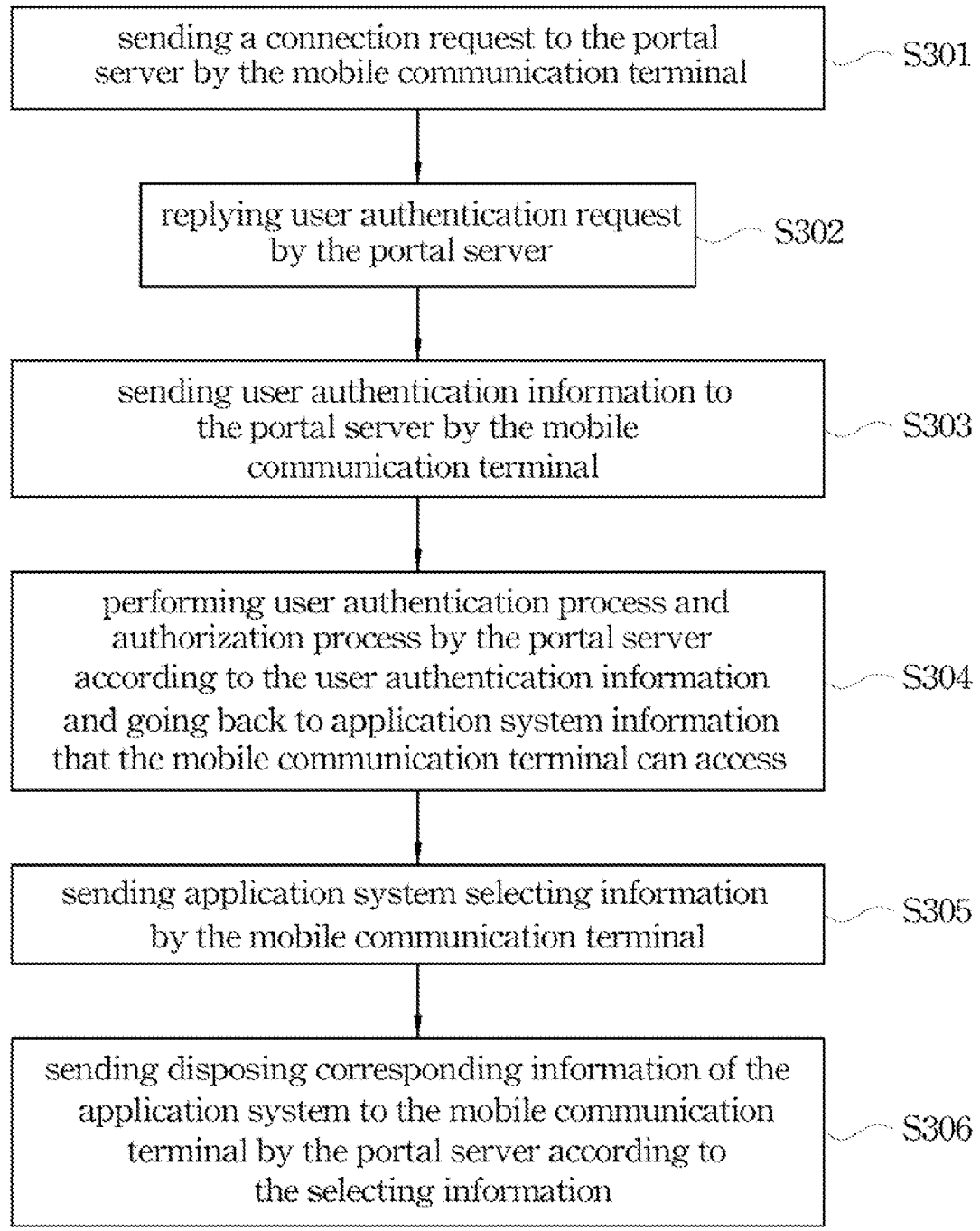
FIG. 3 shows schematically a distribution flowchart of an application system according to one embodiment of the present invention.

Step 201 is a guide procedure between the mobile communication terminal 10 and the portal server 25 for making the mobile communication terminal 10 get the connecting information from the portal server 25 to activate the virtual agent module 11. As shown is FIG. 3, the Step 201 further comprises:

Step 301: sending a connection request to the portal server 25 by the mobile communication terminal 10;

Step 302: replying user authentication request by the portal server 25;

Step 303: sending user authentication information to the portal server 25 by the mobile communication terminal 10;

Step 304: performing a user authentication process and an authorization process by the portal server 25 according to the user authentication information and going back to application system information that the mobile communication terminal 10 can access;

Step 305: sending application system selecting information by the mobile communication terminal 10;

Step 306: sending disposing corresponding information of the application system to the mobile communication terminal 10 by the portal server 25 according to the selecting information.

The guide procedure can be achieved by many modes of the mobile communication such as a short message, a multimedia message, WEB, WAP PUSH, WAP/iMode, and a quick guide.

(2) Guide Portion

Figure 4:
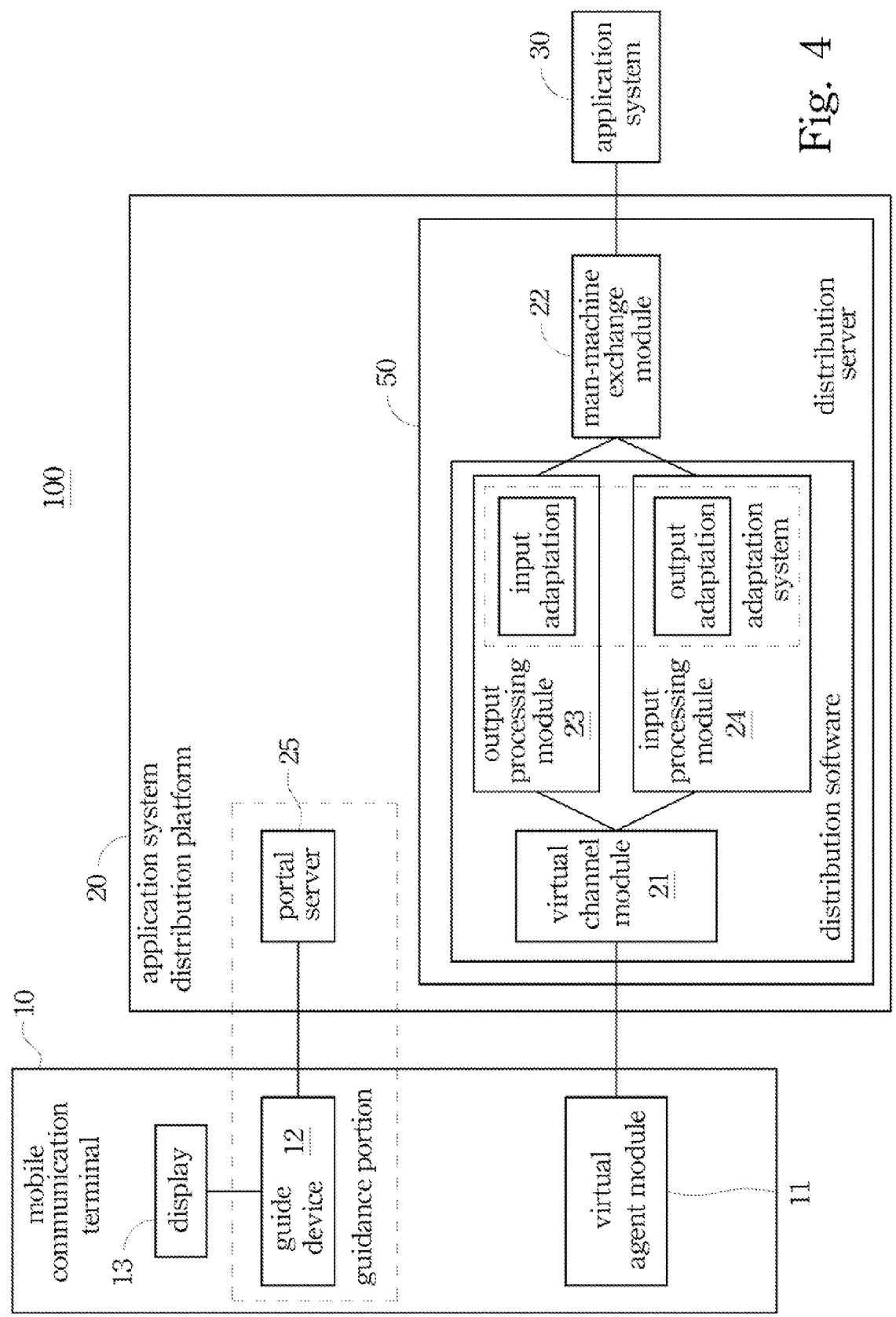
FIG. 4 shows schematically a structure of an application system distribution system according to another embodiment of the present invention.

FIG. 4 shows schematically a structure of an application system distribution system according to another embodiment of the present invention. The mobile communication terminal 10 further comprises a guide device 12 and a display 13. The guide device 12 is a communication unit supported by the mobile communication terminal 10 for performing the guide procedure through the wireless communication mode.

Figure 4A:
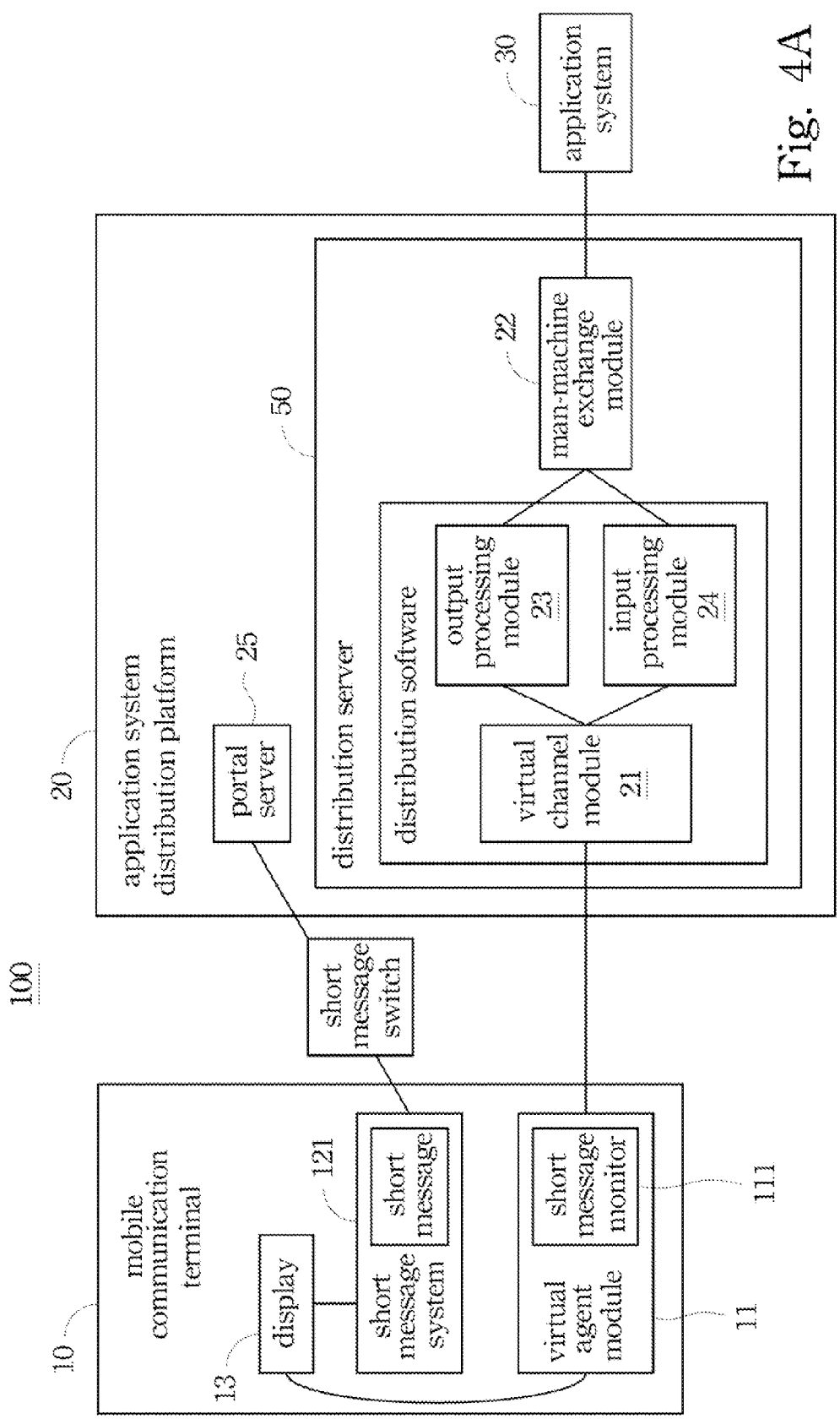
FIG. 4A-4F shows schematically a structure of an application system distribution system according to yet another embodiment of the present invention.

Take the case of the short message mode as shown is FIG. 4A, the guide device 12 is a short message system 121, and the portal server 25 supports a short message service in the mobile communication terminal 10. The virtual agent module 11 further comprises a short message monitor 111.

The mobile communication terminal 10 sends a service request short message to the portal server 25, and the portal server 25 receives the service request short message through a short message channel. The portal server 25 usually distributes a short message service number such as 1065800288 or a similar format, the mobile communication terminal 10 receives a short message from the number and sends the short message to the number, and the mobile communication terminal 10 can perform a short message communication with the portal server 25. When the portal server 25 receives the short message, the portal server 25 replies a user authentication request short message to the mobile communication terminal 10 so as to ask for performing the user authentication process. The mobile communication terminal 10 sends a user authentication message which conforms with the convention format as shown below:

U abc P 12345678

As shown above, U represents a user name, abc represents a specific user name sample inputted by a user, P represents passwords, and 12345678 represents a specific passwords sample inputted by the user.

In a strict security request, information to be user authentication further comprises a number of the mobile communication terminal 10, IMSI (International Mobile Subscriber Identity) of SIM card in the mobile communication terminal 10, a token of a user, and so on.

The portal server 25 performs a user authentication process and an authorization process according to stored user authentication information of a user for replying the application system 30 list a user can access.

After a user selects an application system from the list, the mobile communication terminal 10 sends a short message comprising a name or a serial number of the selected application system. The portal server 25 receives and analyzes the short message so as to learn the application system the user selects, transforms the disposition of the application system 30 into a short message and sends the short message to the mobile communication terminal 10. The typical disposition information is about 100-300 English characters, and a conventional content of a short message is about 140 English characters so that the entire disposition information may be divided into two or three short messages to be sent. The disposition information short message should comprise an identifier, identifying code, a type of the disposition information, a version of the disposition information, a sending time, the divided number of the disposition information, what place the short message is in the entire disposition message, and verification information.

The short message monitor 111 will be activated when the mobile communication terminal 10 starts to monitor each short message the mobile communication terminal 10 receives. The short message monitor 111 analyzes the disposition information when the mobile communication terminal 10 receives the entire disposition information short message and finds the whole disposition information from many short messages according to the identifier.

The short message monitor 111 then activates the virtual agent module 11 and submits the whole disposition information to the virtual agent module 11. The short message mode as mention above, we have to use the short message for obtaining the disposition information and activating the virtual agent module 11. The exchange mechanism between other mobile communication terminal 10 and the portal server 25 can be achieved by other types of the mobile information communication such as multimedia information and WAP, but not limited to the claim scope of the present invention.

When we perform a guide procedure with the short message, it is easy to operate, the require of the system resource is low, and a support rate of the mobile communication terminal 10 is high. Furthermore, owing to the demand of information volume during the guide procedure is low, the conventional content of a short message is enough.

In some conditions, the distribution platform 20 can also give a service prompt to a user actively. For example, if a mail detector is installed in the distribution platform 20, the mail detector can inform the portal server 25 when there is a new mail. In this condition, it will be more convenience for the platform to give a service request.

Take the case of the mail system, the portal server 25 can generate disposition document of the mail system directly and send it to the mobile communication terminal 10, and the mobile communication terminal 10 can open the mail system immediately.

In a more safety condition, the portal server 25 can generate a short message having a mail title and a treatment code. A user replying short message must comprise a treatment code and a user password. The portal server performs a user authentication process to a user. The portal server 25 then generates the disposition document of the mail system and sends it to the mobile communication terminal 10, and the mobile communication terminal 10 can open the mail system immediately.

We can perform a guide procedure with a multimedia message (for example: MMS (multimedia messaging service)) apart from a short message. The multimedia information guidance supports a multimedia function for sending a content and information with full function. The information comprises a variety of information with multimedia formats such as word, image, and voice. The content of the multimedia information compared to the short message is larger, and just one piece of multimedia information can bear the whole information.

Figure 4B:
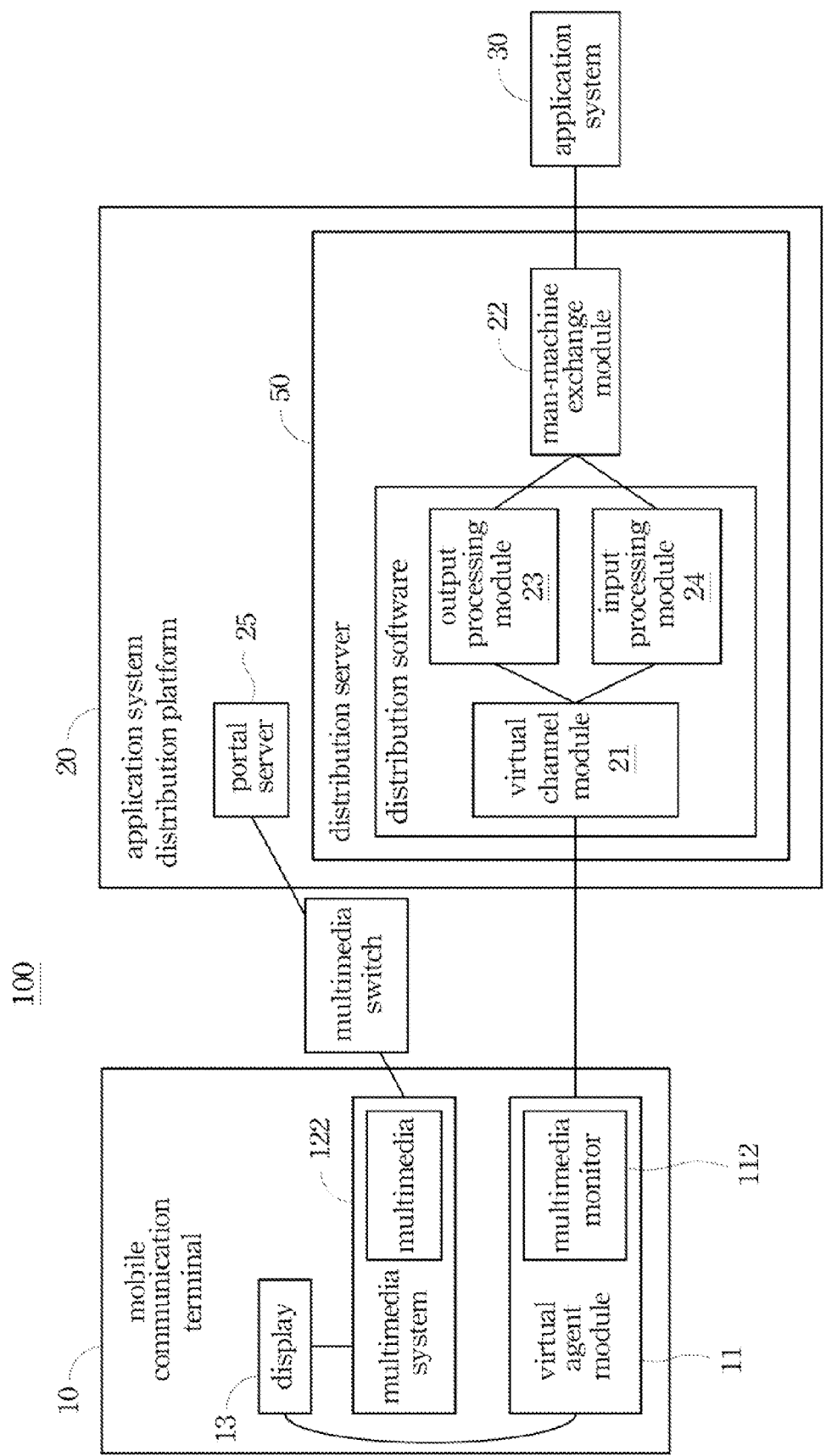

In one embodiment of the present invention as shown in FIG. 4B, the guide device 12 is a multimedia system 122, the portal server 25 supports multimedia service, and the portal server 25 receives multimedia and sends multimedia to the multimedia system 122 through a multimedia channel. The virtual agent module 11 is equipped with a multimedia monitor 112. The guide procedure of the multimedia mode is similar to the guide procedure of the short message mode.

The guide procedure can also be achieved by WAP/iMode technology. The mobile communication terminal 10 supports the operating of WAP/iMode browser, and the portal server 25 supports the service of WAP/iMode. As a result of iMode being similar to WAP, it will merely describe WAP below.

Figure 4C:
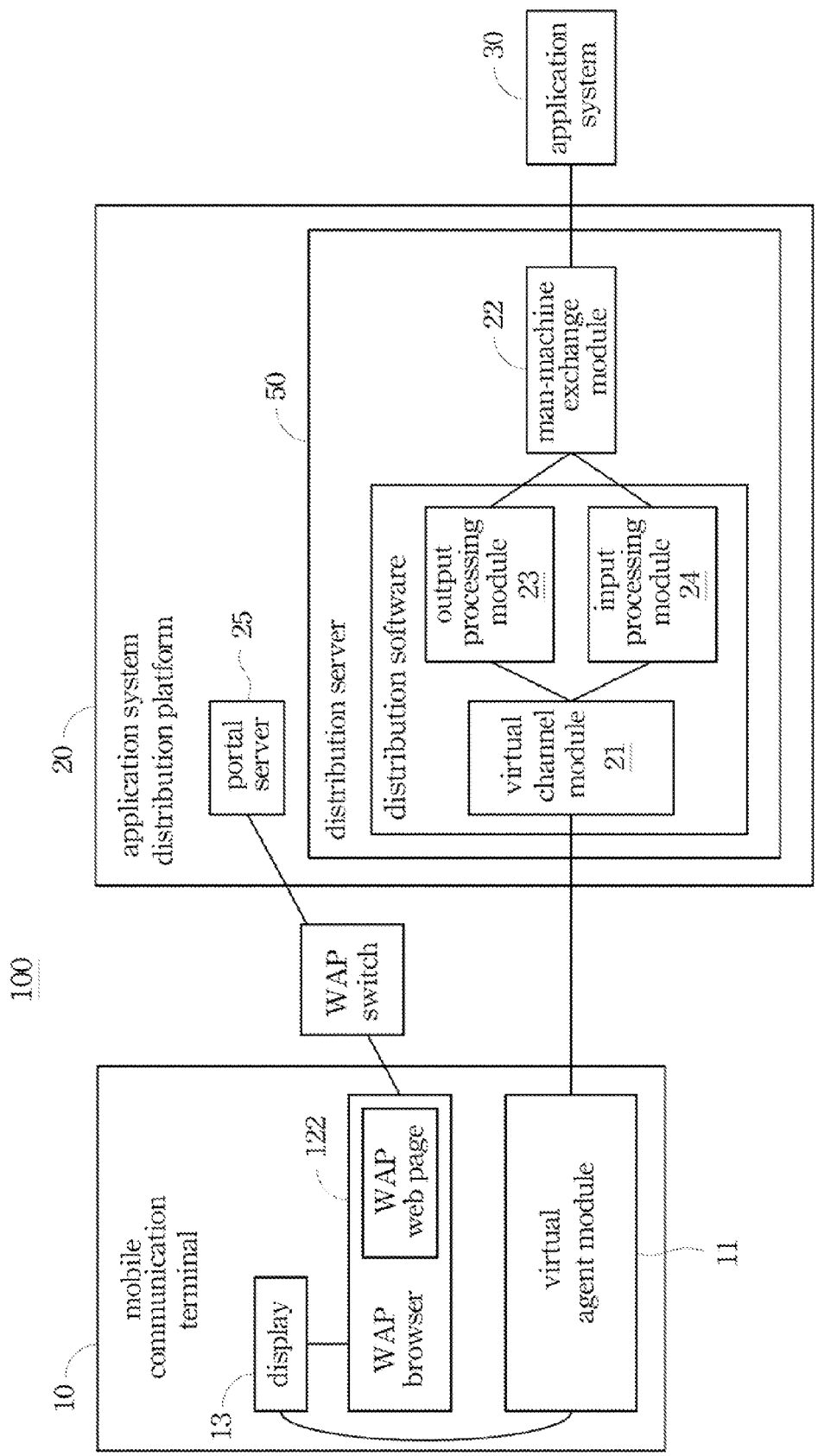

As shown in FIG. 4C, the mobile communication terminal 10 supports WAP, and the guide device 12 is the WAP browser 123. The exchange mechanism between the portal server 25 and the mobile communication terminal 10 can be more convenience with WAP technology so that mobile communication terminal 10 can receive the disposition information by way of the web page or document mode.

First, the virtual agent module 11 needs to register in WAP browser of the mobile communication terminal 10, and the virtual agent module 11 also needs to establish an access in the registering document of the WAP browser so that the virtual agent module 11 can be activated when WAP browser applies to connect to the document whose type is disposition information document.

A user uses WAP browser of the mobile communication terminal 10 to apply for the service through inputting WAP URL of the portal server 25. The portal server 25 returns to the authentication page, and a user uses the mobile communication terminal 10 to send authentication information. After the portal server 25 performs a user authentication process and an authorization process, the portal server 25 sends a WAP page to the mobile communication terminal 10. There is a list of application system 30 the user has authorization to use in the WAP page, and every application system name stores in the web page as a link. When a user wants to perform the application system, the user selects the link which represents the application system on the web page to send request information, and WAP browser obtains a requested disposition information document of the application system from the portal server 25 immediately. WAP compares the disposition document and the registering document. The virtual agent module 11 can be activated if the relation between the disposition information document and the virtual agent module 11 can be found. After the virtual agent module 11 is activated, the disposition information document is analyzed. The virtual agent module 11 establishes a virtual channel with the distribution server according to the information of the document.

The WAP mode as mention above, we have to use the WAP mechanism for obtaining the disposition information and activating the virtual agent module 11. The exchange mechanism between other mobile communication terminal 10 and the portal server 25 can be achieved by other types of the wireless communication such as short message, multimedia information and WAP PUSH.

Figure 4D:
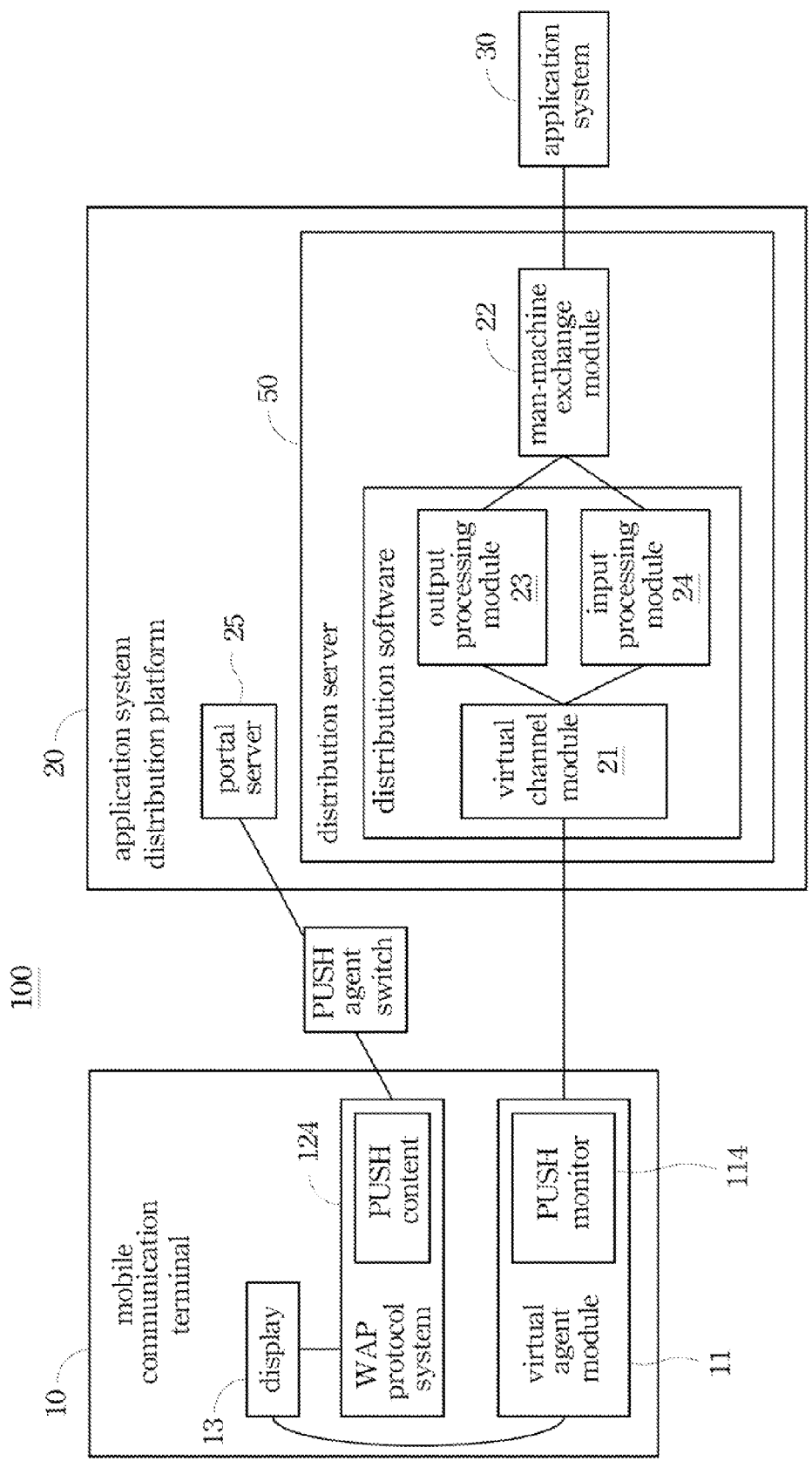

The guide portion of the distribution platform can be achieved by WAP PUSH mechanism. As shown in FIG. 4D, the mobile communication terminal 10 supports WAP, the guide device 12 is a WAP protocol system 124, and the portal server 24 and PUSH agent channel operate in coordination to support WAP PUSH service. WAP PUSH makes the mobile communication terminal 10 have no need to send a request to a server, and the server can send information to the mobile communication terminal 10 actively. Owing to the guide portion of the distribution platform 20 being established with WAP PUSH technology, it's especially suitable for the business which can't anticipate the occurrence time but have to be done at once such as news, stock, a notice, or a mail. As a result of WAP PUSH being a unidirectional communication technology, the portal server 25 can only send information to the mobile communication terminal 10 but can't receive the information sent from the mobile communication terminal 10. We usually have to use other wireless communication measures such as a short message, a multimedia message, WAP, and so on to cooperate with WAP PUSH for guiding.

The step of sending a request by the mobile communication terminal 10 as shown above is achieved by a coordination measure. The portal server 25 uses PUSH agent channel to send a list of available application systems to the mobile communication terminal 10 according to the result of a user authentication process and an authorization process. The mobile communication terminal 10 sends application system selecting information to the portal server 25 as a reply according to the coordination measure. The portal server 25 compiles the disposition information of the application system 30 into WAP form for sending to the mobile communication terminal 10 through WAP PUSH. The typical disposition information is about 100-300 English characters, and the content of one WAP PUSH is enough to bear the disposition information.

The virtual agent module 11 comprises a PUSH monitor 114. The PUSH monitor 114 will be activated when the mobile communication terminal 10 starts to monitor each content of WAP PUSH the mobile communication terminal 10 receives.

When PUSH monitor 114 finds the disposition information the content of WAP PUSH includes, the PUSH monitor 114 activates the virtual agent module 11 and sends the whole disposition information to the virtual agent module 11.

In addition, the content of WAP PUSH can be a document, so we can activate the virtual agent module 11 with PUSH monitor. Specifically, the disposition document is associated with the virtual agent module 11 in the mobile communication terminal 10. As soon as the disposition document PUSH is sent to the mobile communication terminal 10, the virtual agent module 11 will be activated by the mobile communication terminal 10 to process the disposition document.

Some businesses with similar requirements can be achieved by using the active service feature of WAP PUSH server. For example, if a mail detector is installed in the distribution platform 20, the mail detector can inform the portal server 25 when there is a new mail. In this condition, the distribution platform 20 can inform a user actively.

Take the case of a mail system, the portal server 25 can generate a disposition document of the mail system when the portal server 25 learns that there is a new mail. The portal server 25 will send this information to the mobile communication terminal 10 through WAP PUSH, and the mobile communication terminal 10 can open the mail system immediately.

Figure 4E:
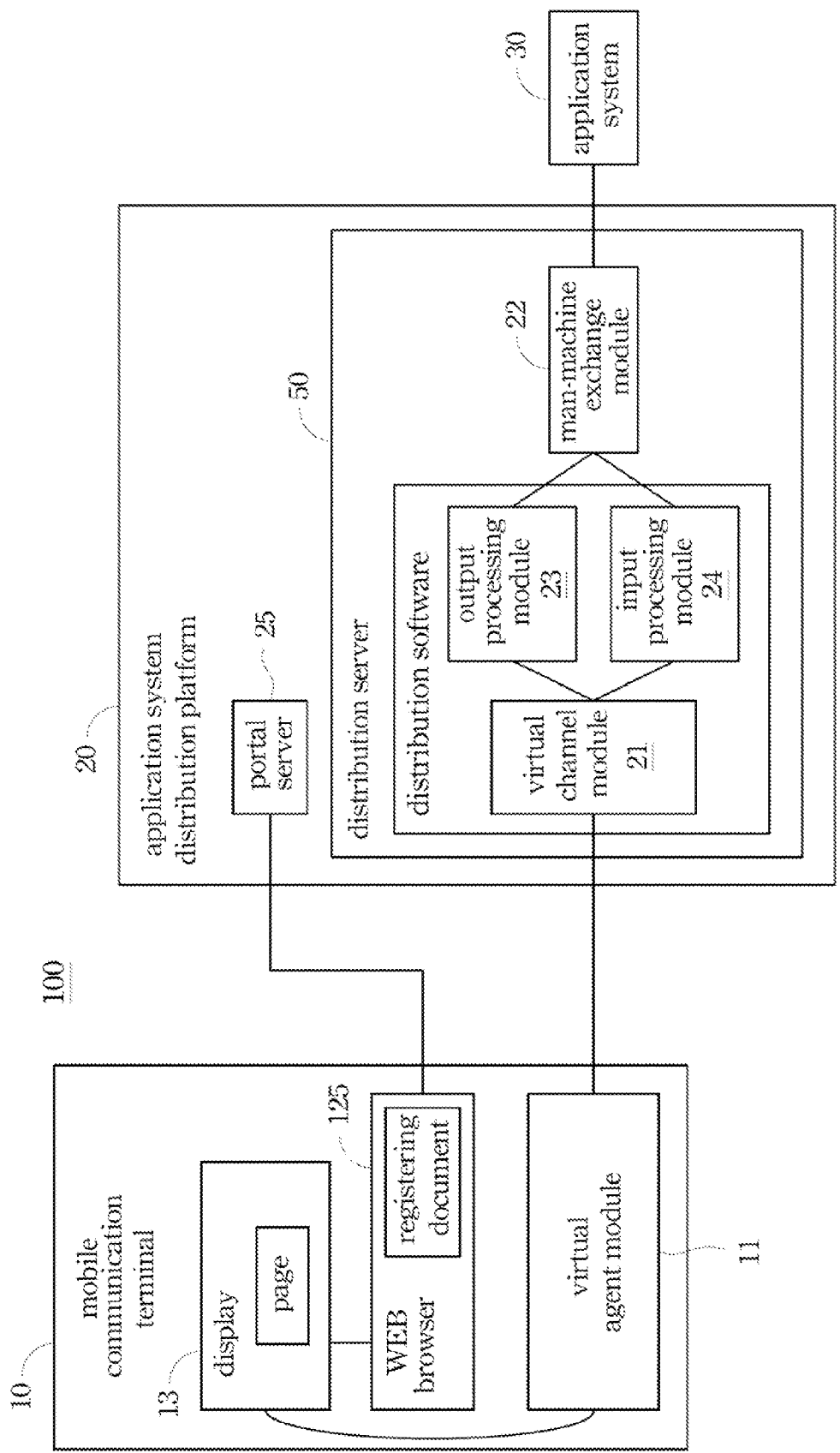
Figure 4F:
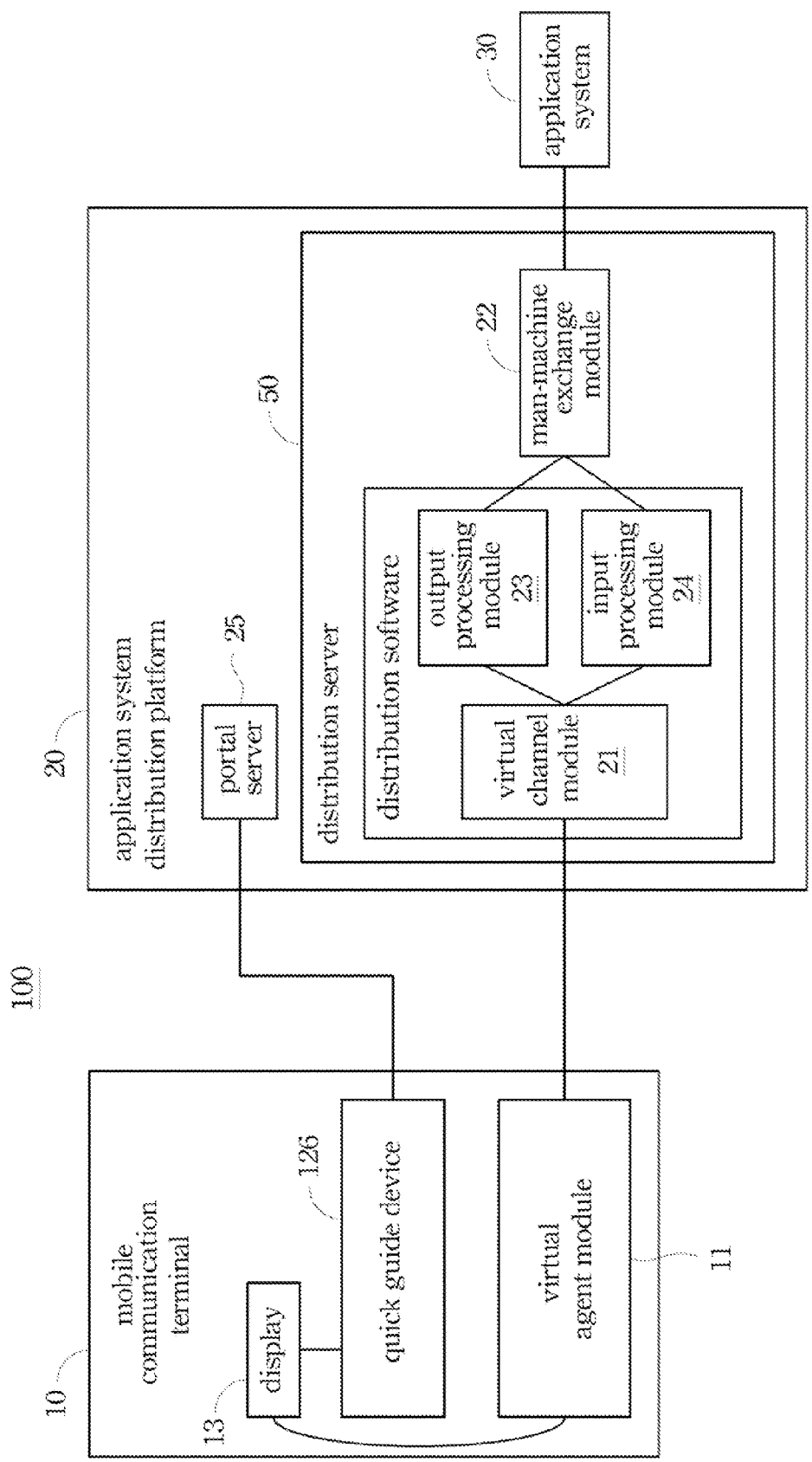

The guide portion of the distribution platform can be achieved by WEB mechanism. As shown in FIG. 4E, the mobile communication terminal 10 supports the operating of WEB browser, and the portal server 25 supports WEB service. WEB is a common application technology of Internet, which provides a fine interface, a broad user base, and a high standardization.

The portal server 25 doesn't have to cooperate with other applications or agents due to the use of WEB technology so that the portal server 25 is easy to achieve, and the construction cost is reduced. WEB technology is similar to WAP, and WEB technology can also send the disposition information by way of the web page or document mode.

In one embodiment of the present invention, the guide device 12 is WEB browser 125. The virtual agent module 11 registers in WEB browser of the mobile communication terminal 10, and the virtual agent module 11 also establishes an access in the registering document of the WEB browser so that the virtual agent module 11 can be activated when WAP browser applies to connect to the document whose type is disposition information document.

A user uses WEB browser of the mobile communication terminal 10 to apply for the service through inputting WAP URL of the portal server 25. The portal server 25 returns to the authentication page, and a user inputs user authentication information. After the portal server 25 performs a user authentication process and an authorization process, the portal server 25 sends a WEB page to the mobile communication terminal 10. There is a list of application system 30 the user has authorization to use in the WAP page, and every application system name stores in the web page as a link.

WEB browser obtains the web page from the portal server 25 and displays the web page on the display of the mobile communication terminal 10. If a user wants to use application system 30 through the human-computer interaction module 22, the user can use the input equipment to choose a link which is corresponding to the application system in the page. WEB browser then obtains a disposition information document which is corresponding to the application system from the portal server 25, and WEB browser compares the disposition document and the registering document. If WEB browser finds the disposition document in the registering document, WEB browser activates the virtual agent module 11. After the virtual agent module 11 is activated, the disposition information document is analyzed. The virtual agent module 11 establishes a virtual channel with the distribution server according to the information of the document.

Furthermore, a user wishes to simplify the process of a user authentication, an authorization and a selection of an application system and activate the human-computer interaction module faster. We can compile the disposition information or the disposition information document in advance and manage them, where the disposition information or the disposition information document comprises user authentication information (such as user name, password, and so on), IP address of a platform, and disposition information of the application system. The guide device 12 is a quick guide device 126, which can receive and analyze the compiled disposition information document. The distribution platform 20 comprises an authentication agent to perform a user authentication process and an authorization process.

Figure 5:
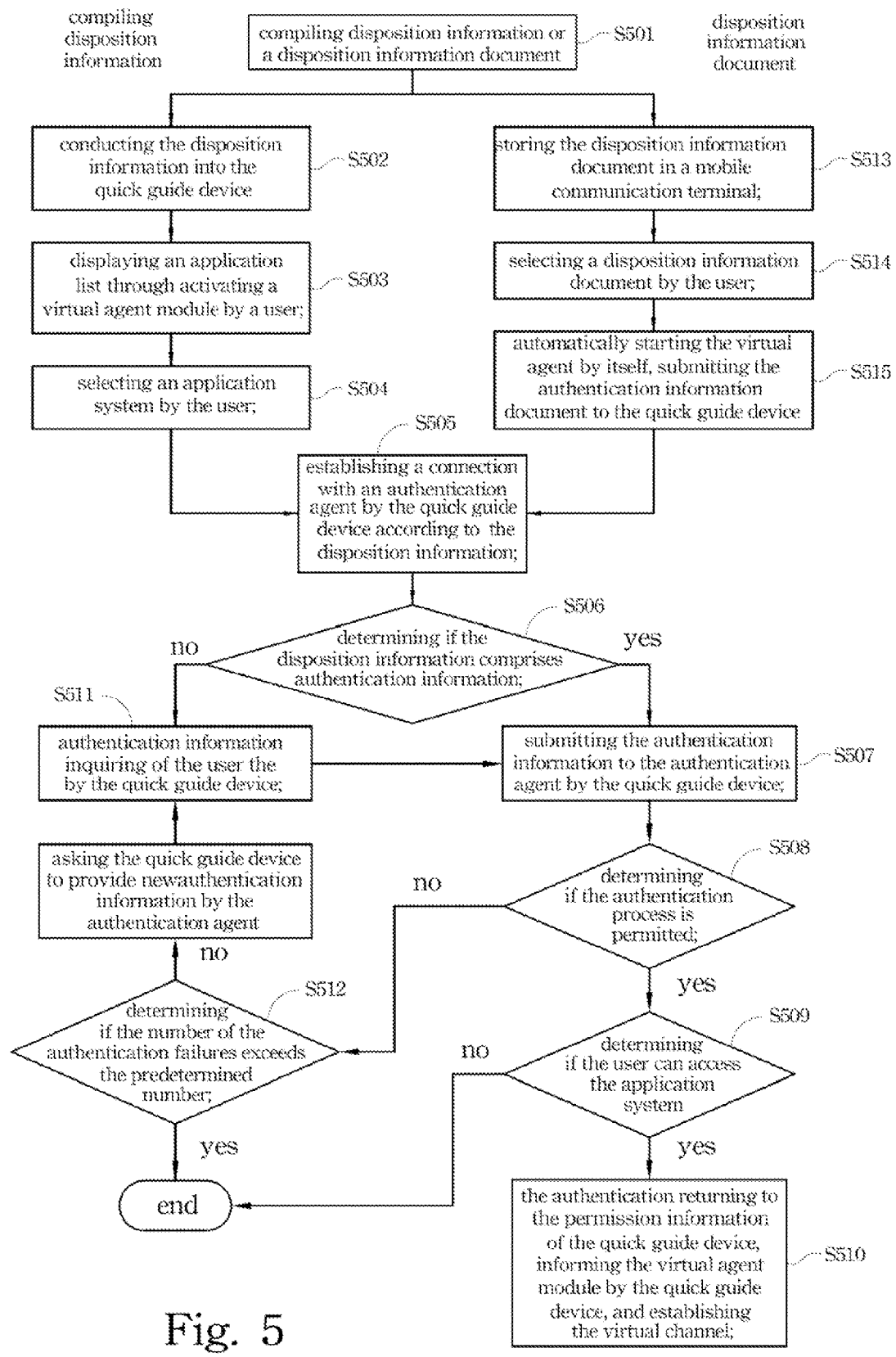
FIG. 5 shows schematically a flowchart of a quick guide according to one embodiment of the present invention.

FIG. 5 shows schematically a flowchart of a quick guide according to one embodiment of the present invention. The quick guide can be performed in two ways. The quick guide comprises the steps of:

Step 501: compiling disposition information or a disposition information document in advance;

Step 502: for the disposition information, conducting the disposition information into the quick guide device;

Step 503: displaying a usable application system list of the quick guide device through activating a virtual agent module by a user;

Step 504: selecting an application system by the user;

Step 505: establishing a connection with an authentication agent of a distribution platform by the quick guide device according to the disposition information;

Step 506: determining if the disposition information comprises authentication information by the quick guide device, proceeding to step 507 when the disposition information comprises the authentication information, or proceeding to step 511 when the disposition information doesn't comprise the authentication information;

Step 507: submitting the authentication information to the authentication agent of the distribution platform by the quick guide device;

Step 508: performing an authentication process for the authentication information by the authentication agent, proceeding to step 509 if the authentication information is affirmed, or proceeding to step 512 if the authentication information is wrong;

Step 509: determining if the user can access the application system by the authentication agent according to the authentication information, proceeding to step 510 when the user can access the application system, or terminating the connection with the distribution platform when the user can't access the application system;

Step 510: the authentication returning to the permission information of the quick guide device, informing the virtual agent module by the quick guide device, and establishing the virtual channel by the virtual agent module;

Step 511: inquiring of the user the authentication information by the quick guide device, inputting authentication information by the user, and proceeding to step 507;

Step 512: determining if the number of the authentication failures exceeds the predetermined number, terminating the connection with the distribution platform when the number of the authentication failures exceeds the predetermined number, or asking the quick guide device to provide new authentication information by the authentication agent and proceed to step 511 when the number of the authentication failures doesn't exceed the predetermined number;

Step 513: for the disposition information document, storing the disposition information document in a mobile communication terminal;

Step 514: selecting a disposition information document by the user;

Step 515: automatically starting the virtual agent by itself, submitting the disposition information document to the quick guide device, and proceeding to step 505.

The disposition information may be a short message, a multimedia message, or WEB PUSH.

For determining the disposition information document being a document obtained from a regular guide procedure or a document compiled in advance for using in a quick guide process, the suffix of the disposition information document is different from the suffix of regular guide document, or the document can be marked a special identification. The virtual agent module 11 gives the disposition information and the control authority to the quick guide device.

(3) Distribution Portion

The mobile communication terminal 10 activates the virtual agent module 11 to establish a virtual channel with the distribution server according to the distribution information of the application system 30 by the method as shown above. The virtual channel is a logical connection, and the mobile communication terminal 10 and the distribution server 50 uses the virtual channel to communicate with each other. The virtual agent module 11 collects input information of a user such as input information of a mouse, input information of a keyboard, and so on from the mobile communication terminal 10, and the virtual agent module 11 sends the input information of the user to the human-computer interaction module 22. The virtual agent module 11 obtains the operating output information of the human-computer interaction module 22 from the human-computer interaction module 22 through the virtual channel to perform the operating such as displaying, broadcasting and printing on the mobile communication terminal 10, where the operating output information comprises a display output, a print output, an audio output and other outputs. When the operating of the human-computer interaction module 22 is over, the distribution platform disconnects the virtual channel.

Figure 6:
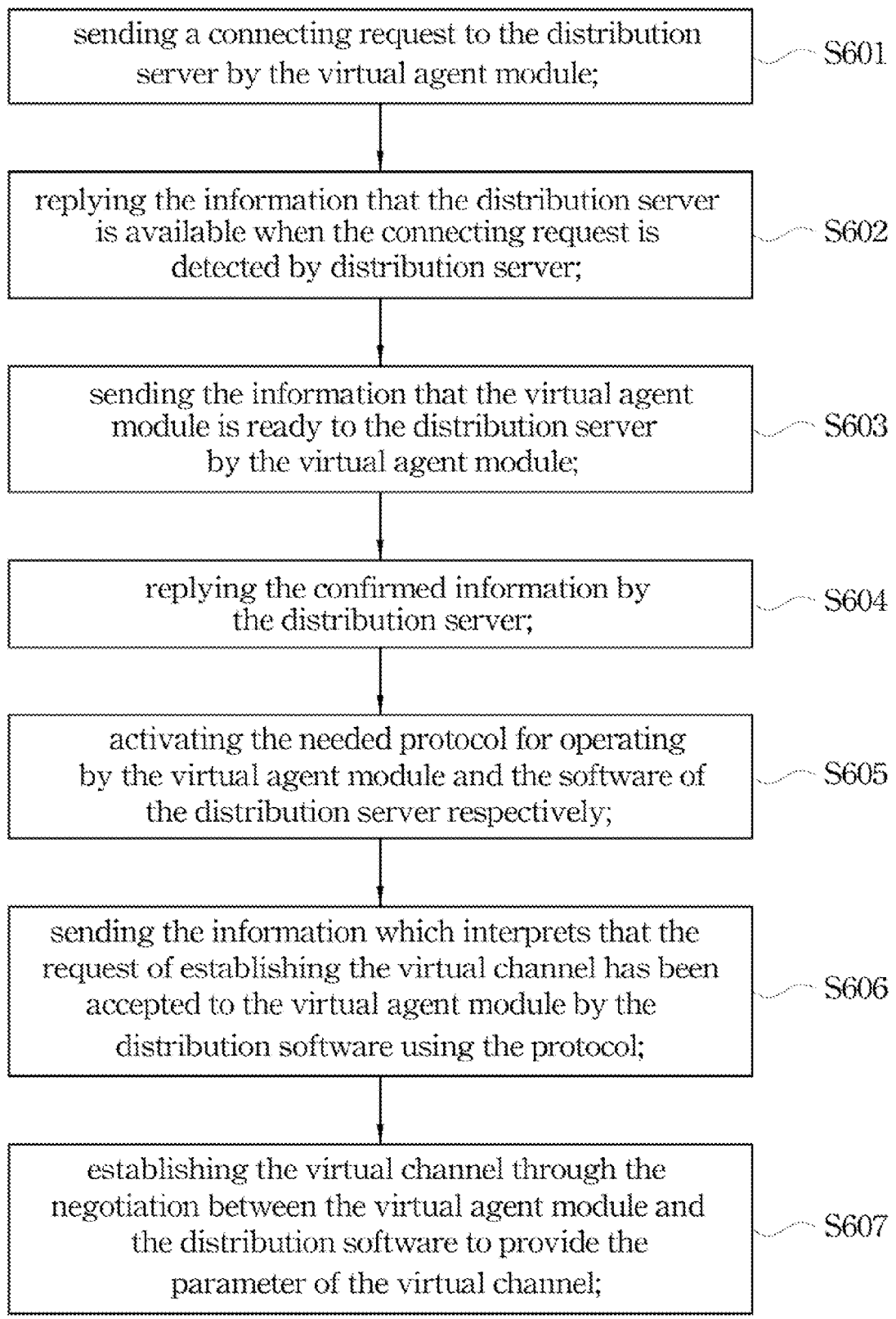
FIG. 6 shows schematically an establishing flowchart of a virtual channel according to one embodiment of the present invention.

FIG. 6 shows schematically an establishing flowchart of a virtual channel according to one embodiment of the present invention, and the establishing flowchart comprises the step of:

Step 601: sending a connecting request to the distribution server 50 by the virtual agent module 11;

Step 602: replying the information that the distribution server 50 is available when the connecting request is detected by distribution server 50;

Step 603: sending the information that the virtual agent module 11 is ready to the distribution server 50 by the virtual agent module 11;

Step 604: replying the confirmed information by the distribution server 50;

Step 605: activating the needed protocol for operating by the virtual agent module 11 and the software of the distribution server 50 respectively;

Step 606: sending the information which interprets that the request of establishing the virtual channel has been accepted to the virtual agent module 11 by the distribution software using the protocol;

Step 607: establishing the virtual channel through the negotiation between the virtual agent module 11 and the distribution software to provide the parameter of the virtual channel;

The method will proceeds to the distribution stage when the virtual channel is establishing.

In the distribution stage, it is enough for the bearer network to carry the information business without further special request. We can use all sorts of the mobile communication networks to carry the information the platform distributes such as GSM CSD, GSM SMS, GSM USSD, GPRS, EDGE, CDMA, CDMA2000, WCDMA, TD-SCDMA, WiMAX-WLAN, Bluetooth, satellite communication. Owing to the small bandwidth of GSM SMS and GSM USSD, they are hard to support a network layer protocol so that we won't use them as the bearer network of the distribution portion but use them as the bearer network of the guidance portion. That is to say, the distribution portion and the guidance portion can use different communication bearer networks or the same communication bearer network.

In the distribution stage, we have to use the protocol that supports remote evaluation comprising VCP, ICA, and VNC/X-WINDOW. As shown below, we take the case of the VCP.

VCP (virtual channel protocol) is a communication protocol that the distribution platform 20 uses in the distribution stage, which is used as a communication between the distribution server 50 and the communication terminal 10 to establish the network layer connection. VCP only needs the communication terminal 10 and the distribution server 50 to support the basic protocol, and VCP can be used in most of the conventional network layer protocol such as TCP/IP-IPX-SPX-NETBIOS, asynchronous links, and so on.

VCP is used as a communication between the distribution server 50 and the communication terminal 10, and VCP has following capabilities: a variety of distributions of the application operating display images, the ability to process the input of the mouse and the keyboard, session control, the support of asynchronous link, error detection and error validation, the support of compressing and encryption, redirection of document system, redirection of printing, the support of virtual channel.

The data packet format of the VCP protocol is as follow:

Command information is a selectable domain, and it comprises the detailed parameter of part of the command and the data packet of the subchannel protocol.

Postamble is a selectable protocol tail for using in asynchronous communication.

The preamble and the postamble are needed in some condition, and only the command field is needed at all time.

The mobile communication terminal 10 doesn't perform any code corresponding to application system 30 practically when the application system 30 and the human-computer interaction module 22 thereof operate in the distribution server 50. As a result, the remote communication problem between the distribution server 50 and the mobile communication terminal 10 has to be solved. The local memory of the mobile communication terminal 10 and the printer can also be used by application system 30.

Figure 7:
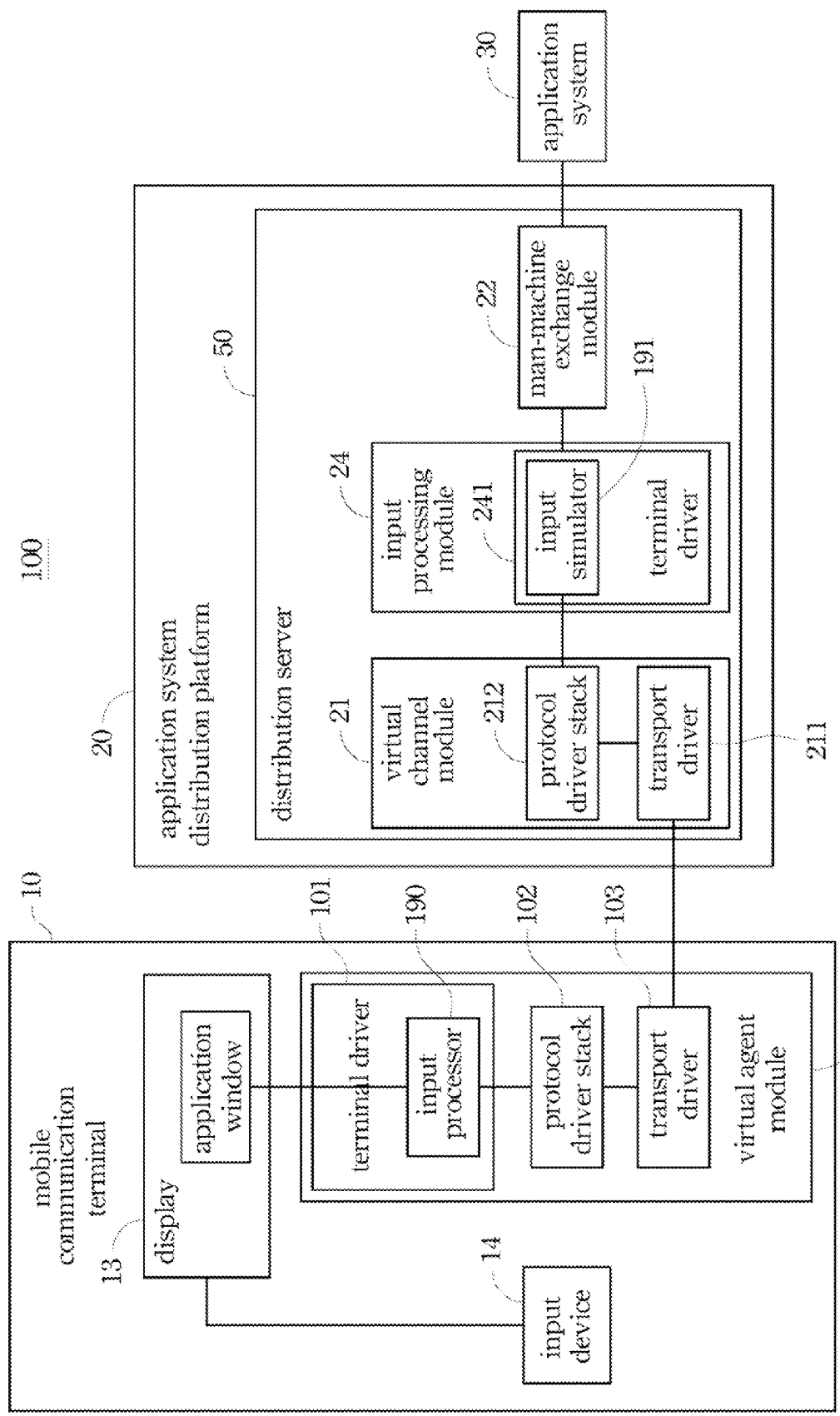
FIG. 7 shows schematically a structure of an input processing in an application system distribution system according to one embodiment of the present invention.

FIG. 7 shows schematically a structure of an input processing in an application system distribution system according to one embodiment of the present invention.

As shown in FIG. 7 according to VCP protocol, the mobile communication terminal 10 comprises a display 13, an input device 14, and a virtual agent module 11. The virtual agent module 11 of the distribution server 50 further comprises a terminal driver 101, a protocol driver stack 102, and a transport driver 103. The terminal driver 101 processes the top layer function of the VCP, and the terminal driver 101 comprises an input processor 190. The virtual channel module 21 comprises a transport driver 211, a protocol driver stack 212, and an input processing module 24 comprising a terminal driver 241. The virtual channel module 21 further comprises an input simulator 191.

The terminal driver 101 is used to receive, interpret, and process the information generated from the mobile communication terminal 10 and the distribution platform 20. The protocol driver stack 102 is the communication layer in the protocol stack for preparing the information to be sent. The transport driver 103 is a king of protocol driver for connecting with the communication service interface of the system.

A user uses the input device of the mobile communication terminal 10 to input, the virtual agent module 11 receives the input information, and the input information is packaged into VCP protocol data packet. The packaged input information is sent to the distribution server 50 through the virtual channel. The virtual channel module 21 receives the protocol packet, and the virtual channel module 21 decrypts and decompresses the protocol packet for sending it to the input processing module 24. The input processing module 24 interprets VCP protocol packet, draws out the input information of the user, and sends it to the human-computer interaction module 22.

| Preamble | Reliability | Encryption | Compression | Command | Command information | Postamble |
|---|---|---|---|---|---|---|

Preamble is a selectable protocol head for using as the preamble information.

Reliability is a selectable protocol head for checking and correcting the transmission failure.

Encryption is a selectable protocol head for managing the encrypted data.

Compression is a selectable protocol head for managing the compressed data.

Command is an instruction the protocol needs to perform, it is the beginning of the body of a data packet, and it has to be installed.

The human-computer interaction module 22 operates with its own logic according to the input information of the user.

The input processor 190 of the terminal driver 101 is used to perform a code management for the input information.

The terminal driver 101 packages the managed input information into VCP protocol packets according to the command and the command information of the VCP format and sends them to protocol driver stack 102.

The protocol driver stack 102 performs a further process to the packaged input information according to the disposition of the system and sends if to the transport driver 103. The process comprises compression, reliability process, framing package, encryption, and so on.

The transport driver 103 connects to the communication interface of the operating system and sends the protocol packet to the distribution server 50 of the distribution platform 20 through the virtual channel.

The transport driver 211 of the distribution server 50 receives the protocol packet from the operating system interface of the distribution server 50 and sends it to the protocol driver stack 212.

The protocol driver stack 212 performs a decrypt process, a frame process, a reliability test process and a decompression process on the protocol packet and sends it to the terminal driver 241 of the input processing module 24.

The terminal driver 241 analyze the protocol packet according to VCP protocol standard, draws out information thereof, and sends it to the input simulator 191.

The input simulator 191 inputs an analog data into the human-computer interaction module 22 according to the input information. The method of transforming the operating program into an analog local input is many in a variety of operating systems. In the windows system, for example, we usually use some API function such as Keybd_event, mouse_event function to perform the analog input of the keyboard and the mouse, and we also use all sorts of the information analog input such as WM_KEYDOWN, WM_KEYUP, and so on.

The human-computer interaction module 22 cooperates its own operating logic to operate when the human-computer interaction module 22 receives these input information.

We describe the detailed process of the input as shown below.

The virtual agent module 11 establishes and controls an application window and displays the application window on the display. The virtual agent module 11 obtains all information that a user inputs in the application window. Specifically, all information is obtained by the input processor 190 of the terminal driver 101 in the virtual agent module 11. The input information comprises a position, a movement, and a click of the mouse or other pointing device, and a keyboard input. The input information is generated according to the image interface from current output to the mobile communication terminal 10.

Figure 8:
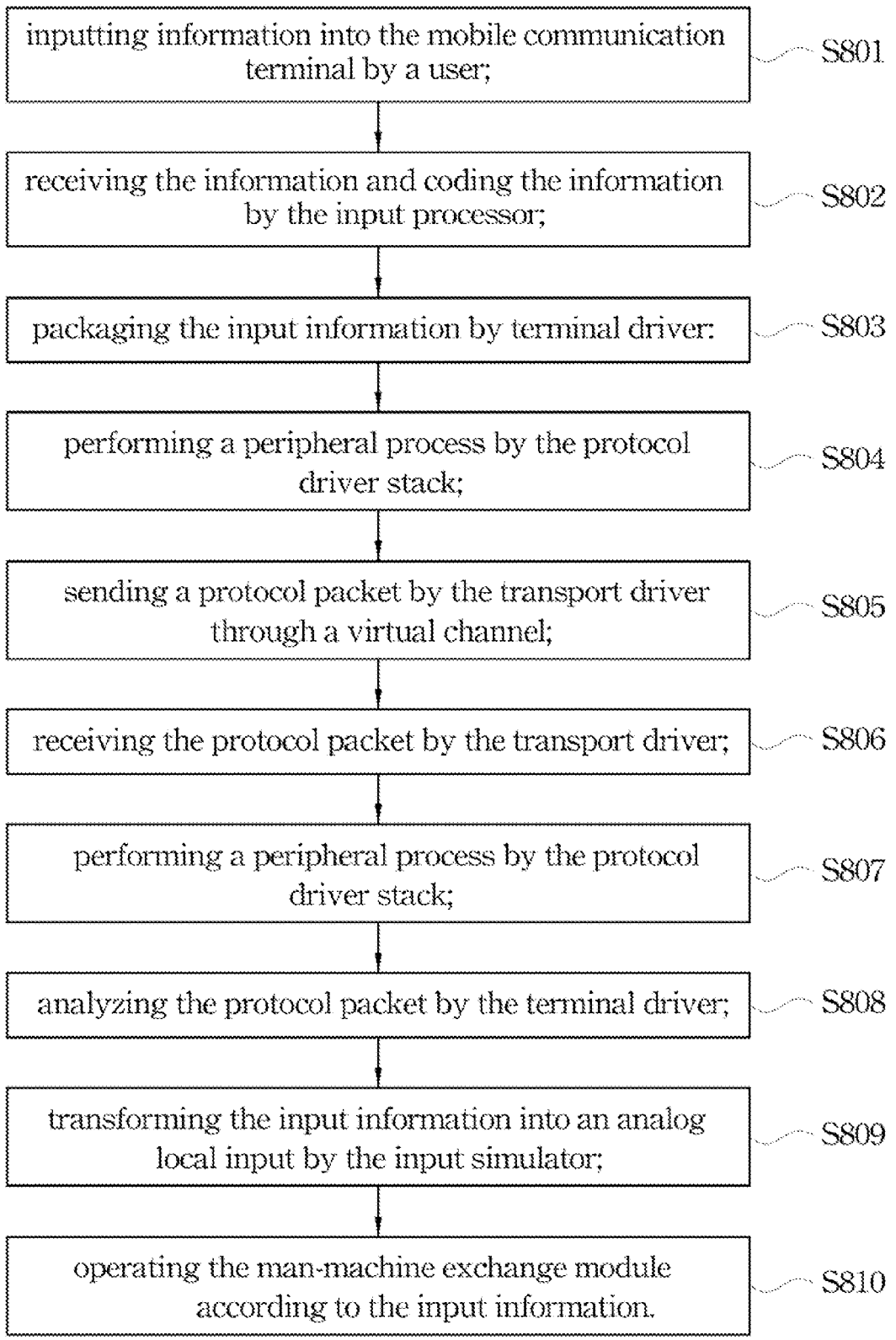
FIG. 8 shows schematically a flowchart of an input process according to one embodiment of the present invention.

FIG. 8 shows schematically a flowchart of an input process according to one embodiment of the present invention. The input process comprises the steps of:

Step 801: inputting information into the mobile communication terminal 10 by a user;

Step 802: receiving the information and coding the information by the input processor 190;

Step 803: packaging the input information by terminal driver 101:

Step 804: performing a peripheral process by the protocol driver stack 102;

Step 805: sending a protocol packet by the transport driver 103 through a virtual channel;

Step 806: receiving the protocol packet by the transport driver 211;

Step 807: performing a peripheral process by the protocol driver stack 212;

Step 808: analyzing the protocol packet by the terminal driver 241;

Step 809: transforming the input information into an analog local input by the input simulator 191;

Step 810: operating the human-computer interaction module 22 according to the input information.

The information is, for example, a link for selecting an application system.

We describe the detailed process of the output as shown below.

The distribution platform 20 is used to perform a stripping process between the man-machine interface and the operating logic. The operating logic of the application system functions on the distribution platform 20 and sends the output information such as screen refreshing generated from the human-computer interaction module 22 through VCP protocol to the mobile communication terminal 10.

For saving limited network resource and the mobile communication terminal resource, the distribution platform doesn't send all application display page of the application system operating to the mobile communication terminal 10 directly, but the distribution platform reduces the information volume to increase the efficiency of the system.

The process method of the application system screen display can be achieved in several ways such as a GUI vector command, a frame buffer and compressing, and other conventional technologies.

For using the GUI vector command method of the underlying operating system, the distribution server 50 activates the human-computer interaction module 22 of the application system 30 when the mobile communication terminal 10 establishes a virtual channel with the distribution server 50, and the distribution server 50 will give the user of the mobile communication terminal 10 a piece of memory as its virtual display memory at the same time.

The distribution server 50 redirects the output window of the human-computer interaction module 22 to the virtual display memory at the same time. There are many methods of redirecting the application window in the Windows system such as acquiring the GDI command of the target window and changing its hdc into the hdc of the user's own window or the index of one memory. Thus, the image output of the target window will be transferred to the user's window or the designated memory region.

The display operating redirected by the distribution server 50 is decomposed into several Windows GDI commands, and the distribution server 50 sends these commands to the mobile communication terminal 10 for decoding and displaying. In this way, we have to define the portion of display driver alone for repackaging the driver program from the driver and translating it into display driver command in the protocol, namely GUI instruction. GUI vector command can achieve the goal of remote displaying by sending upper drawing command. These commands support typeface, icon, drawing command, and so on. It has a better network bandwidth utilization rate but a poor cross-platform ability for using the GUI vector command method.

For using the frame buffer and compressing, we have to distribute the virtual display memory and the frame buffer to the user of the mobile communication terminal 10 on the distribution server 50, and we have to redirect the output of the human-computer interaction module 22 into the virtual display memory. The frame buffer is a piece of memory in the distribution server 50, the frame buffer stores the changing portion of the virtual display memory by way of image. The process comprises the steps of:

First, updating the frame buffer according to the change of the virtual display memory, namely the change of displaying output of the human-computer interaction module 22;

Second, performing a compressing process to the image memory of the frame buffer and sending it to the mobile communication terminal 10.

The content of the frame buffer is images. We usually use a loseless compressing process such as RLE and LZW. GUI interface of the application system in the platform is usually simple, its lines and color are unity and regular so that it is extremely suitable for performing the loseless compressing process to it. For processing the continuously image, the loseless compressing process can only process the changed portion of the transport image so that the loseless compressing process can further reduce the information volume of the transmission. Furthermore, the algorithm of the loseless compression is simple, the operating speed of the loseless compression is fast, and the loseless compression is especially suitable for the mobile communication terminal application field.

We can also use the lossy compressing algorithm to process the content of the frame buffer, and the lossy compressing algorithm is, for example, JPEG standard. The JPEG standard is used in natural images, and it isn't suitable for simple image like GUI. The efficiency of the JPEG algorithm is lower than the efficiency of the simple compressing algorithm when there is no image on the processing interface. The efficiency of the JPEG algorithm is greater than the efficiency of the loseless compressing algorithm when most of the interface is full of images.

No matter we use the loseless compression or the lossy compression, after we set an appropriate interface, the using of the frame buffer and the compression are not limited to the operating system to provide platform independence.

The updating strategy of the frame buffer can be categorized into two types, that is, a lazy strategy and a positive strategy.

The lazy strategy is decomposed virtual display memory into several rectangle region. When the distribution server detects a change in some rectangles of virtual display memory, the distribution server puts display data of the changed region into the frame buffer in determined time interval. When the mobile communication terminal 10 sends an updating request, the application system distribution platform 20 draws out the changed rectangle block from the frame buffer and performs a comparing process and a merge process to the rectangle block. If there is repeated data in the same rectangle region, the application system distribution platform 20 deletes the previous buffer data and uses the new buffer data. The application system distribution platform 20 then performs a compression and coding process to the merged data and sends it to the mobile communication terminal through the virtual channel.

The active strategy is that as long as the screen of the human-computer interaction module 22 in the distribution server 50 is updated, sends it to the mobile communication terminal 10 right away. When transporting a large number of the image data such as video, the mobile communication terminal 10 updates actively to make the distribution server can keep up with the updating, but the transported data volume will increase. Furthermore, the timely updating ask the mobile communication terminal processing these updating immediately, this will increase the calculated load of the mobile communication terminal. Take the case of the frame buffer, the compression method and the lazy strategy, we will describe in detailed as shown below.

Figure 9:
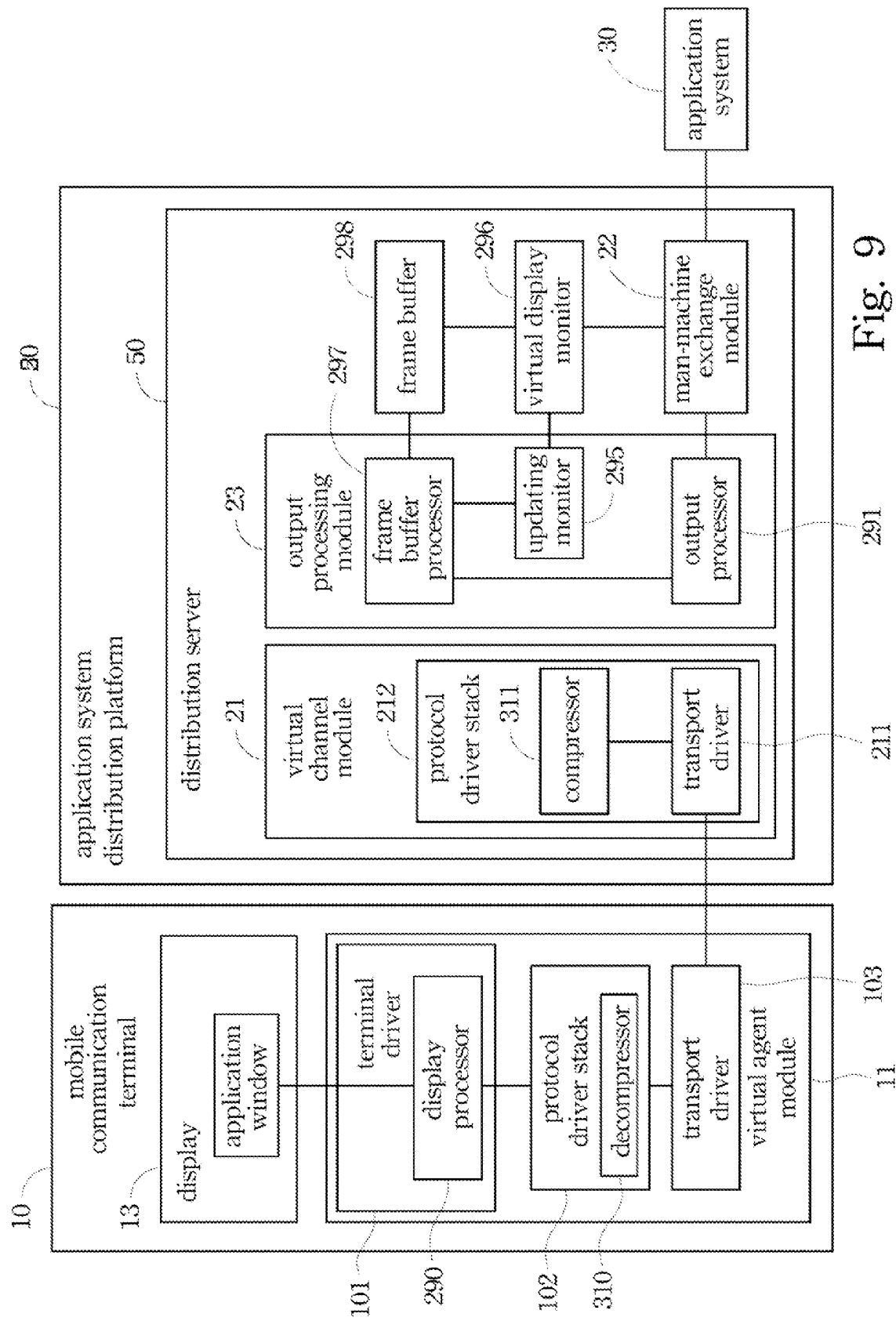
FIG. 9 shows schematically an output structure of an application system distribution system having a frame buffer technology according to one embodiment of the present invention.

FIG. 9 shows schematically an output structure of an application system distribution system having a frame buffer technology according to one embodiment of the present invention.

On the basis of FIG. 7, the terminal driver 101 further comprises a display processor 290, the protocol driver stack 102 comprises a decompressor 310, the protocol driver stack 212 further comprises compressor 311 for performing a compressing process to the screen updating data, the output processing module 23 further comprises a frame buffer processor 297, an updating monitor 295 and an output processor 291, and the distribution server 50 further comprises a virtual display memory 296 and a frame buffer 298.

When the terminal driver 102 uses the human-computer interaction module 22, the display process is redirected. The display output of the human-computer interaction module 22 is redirected to the virtual display memory 296. The updating monitor 295 divides the virtual display memory 296 into several rectangle regions, and the updating monitor 295 observes each region at all time. As long as a change occurs in one region, that is to say, there is a new display output generated by the human-computer interaction module, the frame buffer processor 297 receives a notice.

The frame buffer processor 297 processes the frame buffer 298 according to a fixed time interval. When the frame buffer processor 297 receives the change notice of the updating monitor 295 and the time interval comes, the frame buffer processor 297 copies the changed rectangle region in the virtual display memory to the frame buffer 298.

The mobile communication terminal 10 sends an updating request to the distribution server 50 according to a certain rule. The frame buffer processor 297 receives all changed rectangle region from the frame buffer 298 and performs a comparing process and a merge process to these rectangle region when the frame buffer processor 297 receives the updating request. If there is repeated data in the same rectangle region, the application system distribution platform 20 deletes the previous buffer data and uses the new buffer data. The application system distribution platform 20 then sends the merged display updating data to the output processor 291.

Figure 10:
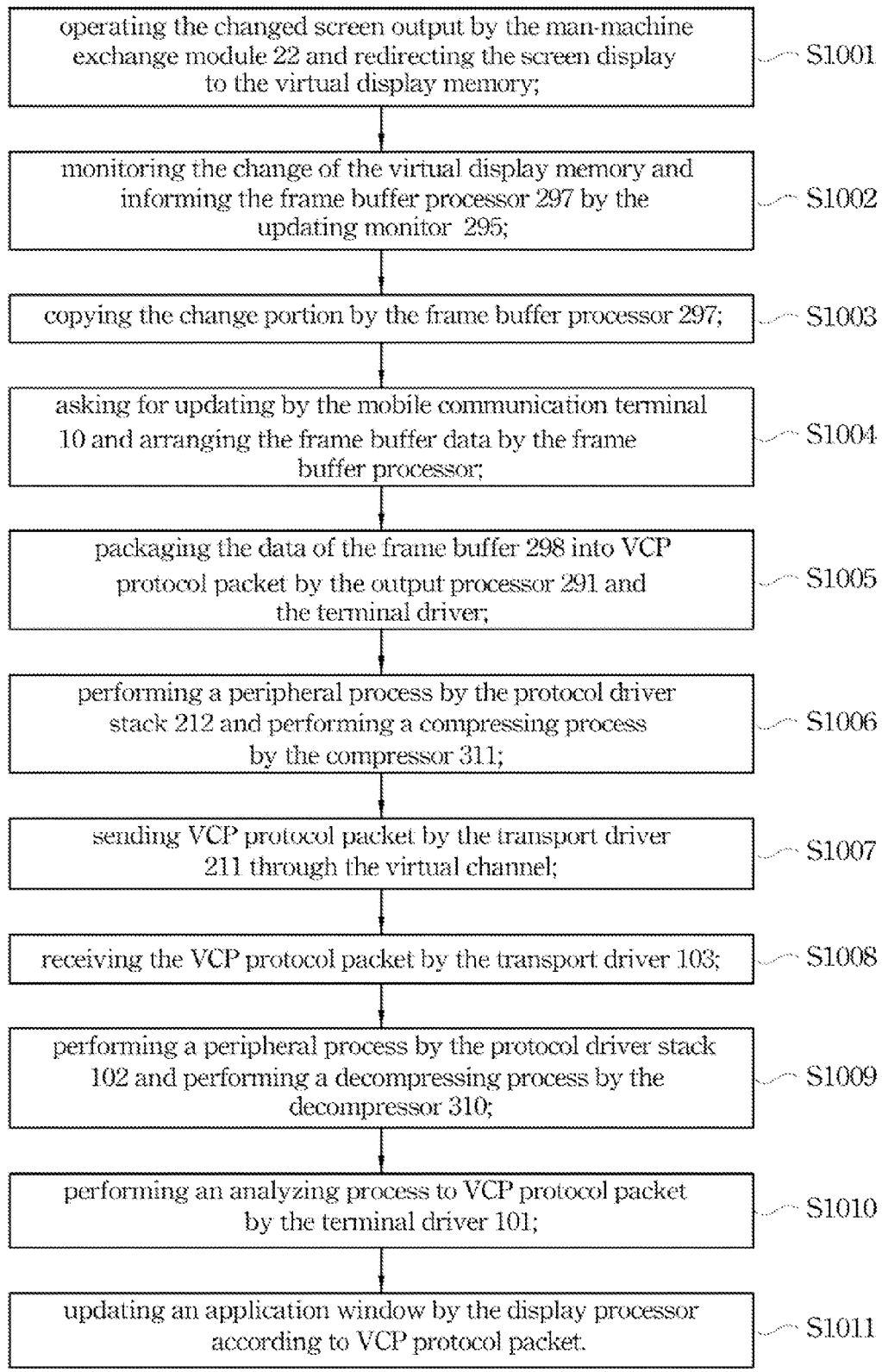
FIG. 10 shows schematically an output flowchart with a frame buffer technology according to one embodiment of the present invention.

FIG. 10 shows schematically an output flowchart with a frame buffer technology according to one embodiment of the present invention.

Step 1001, operating the changed screen output by the human-computer interaction module 22 and redirecting the screen display to the virtual display memory;

Step 1002, monitoring the change of the virtual display memory and informing the frame buffer processor 297 by the updating monitor 295;

Step 1003, copying the change portion by the frame buffer processor 297;

Step 1004, asking for updating by the mobile communication terminal 10 and arranging the frame buffer data by the frame buffer processor;

Step 1005, packaging the data of the frame buffer 298 into VCP protocol packet by the output processor 291 and the terminal driver;

Step 1006, performing a peripheral process by the protocol driver stack 212 and performing a compressing process by the compressor 311;

Step 1007, sending VCP protocol packet by the transport driver 211 through the virtual channel;

Step 1008, receiving the VCP protocol packet by the transport driver 103;

Step 1009, performing a peripheral process by the protocol driver stack 102 and performing a decompressing process by the decompressor 310;

Step 1010, performing an analyzing process to VCP protocol packet by the terminal driver 101;

Step 1011, updating an application window by the display processor according to VCP protocol packet.

(4) Adaptation Portion

The above mention technological plan satisfies the basic steps for distributing the application system 30 to the mobile communication terminal 10, so we can use the steps to distribute the application system 30 directly. The display interface of the normal application system is developed for PC terminal. PC terminal at least supports a 800×600 display, and the mobile communication terminal usually supports a 320×240 display. There is a great difficulty for a user to read or operate when we use a small screen, namely the mobile communication terminal screen, as an application interface to be displayed. For increasing the satisfaction of a user, we have to arrange the display interface of the mobile communication terminal so as to make the display interface correspond with the specification of the mobile communication terminal.

Figure 11:
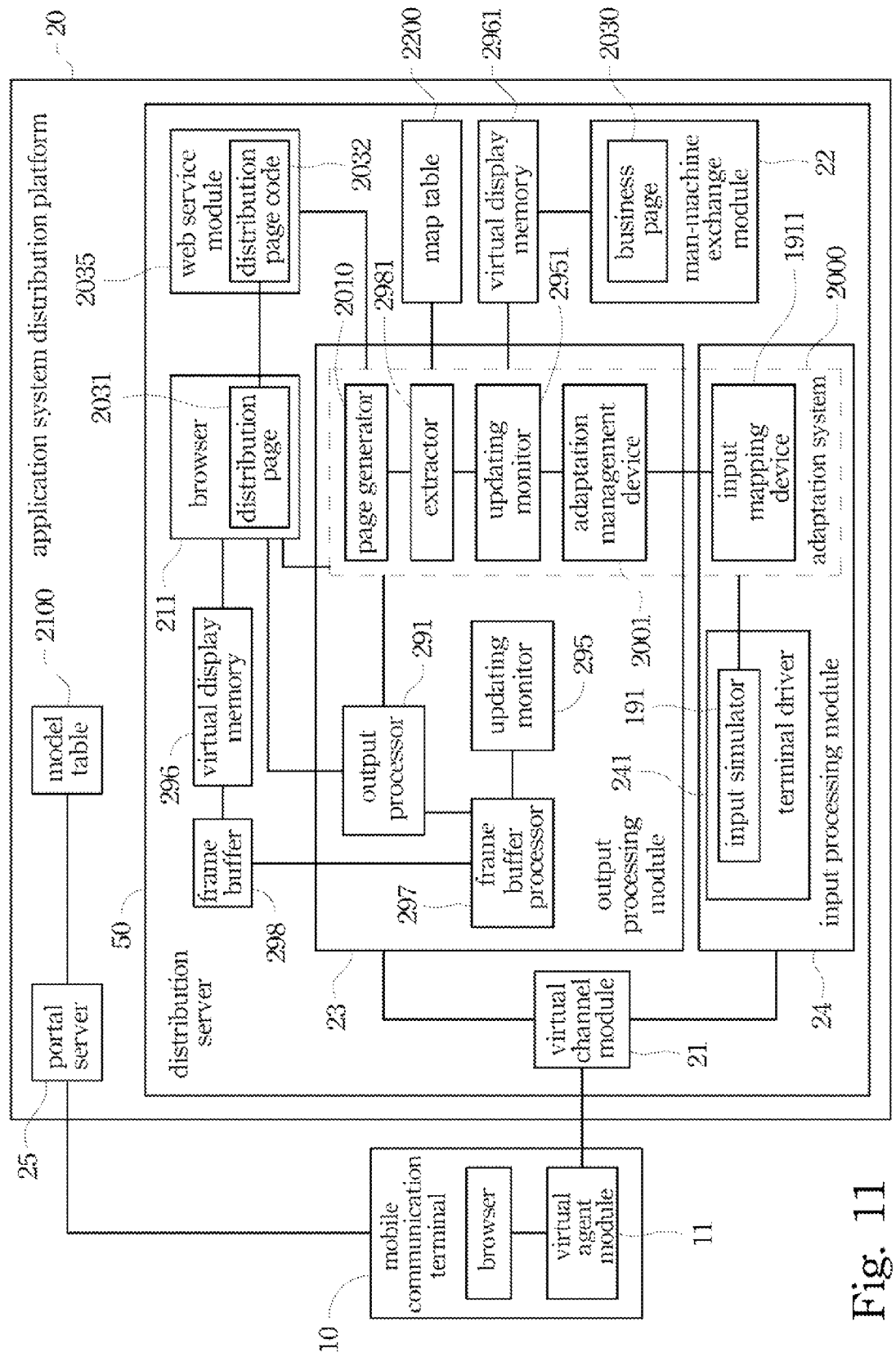
FIG. 11, 11A, 11B shows schematically a structure of a distribution system according to one embodiment of the present invention.

The present invention further installs an adaptation system in the distribution server 50 for the output of the human-computer interaction module to adapt to the mobile communication terminal and mapping the input operation of a user to the input information of the human-computer interaction module so that the user can operate the human-computer interaction module properly. FIG. 11 shows schematically a structure of a distribution system according to one embodiment of the present invention. On the basis of the previous drawings, the distribution system further comprises an adaptation system 2000 installed in the output processing module 23 and the input processing module 24.

The input processing module 24 further comprises an input mapping device 1911, and the output processing module 23 further comprises an adaptation management device 2001, an updating monitor 2951, an extractor 2981 and a page generator 2010.

There are a map table 2200 and a model table 2100, which store in the storage unit of the distribution server 50. The map table 2200 is used to record a corresponding relation, position information and a current state of all page elements of an original business page and an adapted new structure distribution page. The model table 2100 is used to record information (such as model information, a specification of the display, and so on) of all mobile communication terminals that have been registered in the distribution platform.

The distribution server 50 further comprises a browser 221, a web service module 2035, a virtual display memory 296 for redirecting the adapted business page (distribution page), and a virtual display memory 2961 for obtaining an original business page so as to obtain each element in the original business page.

The method of using the adaptation system 2000 to satisfy an output adaptation is shown below. The main manner of the output adaptation comprises one or more items as follow.

1—The human-computer interaction module customization: the menu and the tool bar that occupy the space of the human-computer interaction module without practical effect will be canceled for using the biggest screen space to display the effective content;

2—The mobile communication terminal information obtainment: the distribution platform obtains the specification of mobile communication terminal screen when a user registers or determines the adaptation strategy and the parameter according to whether the user accepts the adaptation;

3—The transformation of the interface: there are essentially two transformation methods:

For WEB page with simple and static page element such as bulletin board, we use a simple mode;

For WEB page with complex and dynamic page element and all none B/S application, we use a multi-page mode.

First, we need to customize the externals of the human-computer interaction module 22, and the menu and the tool bar that occupy the space of the human-computer interaction module without practical effect will be canceled for using the biggest screen space to display the effective content.

For the browser of the B/S architecture, we need to cancel a menu, a toolbar, an address bar, a link bar, a status bar, and other toolbar generated by plugins and minimize the border width. For part of the application that has to use a toolbar to achieve the corresponding function, we can keep the toolbar.

For the user terminal of C/S application and the stand-alone application, we also need to regulate the interface arrangement and maximize the effective display region.

We only need to perform above customization process once when the human-computer interaction module is installed in the distribution platform.

Figure 11A:
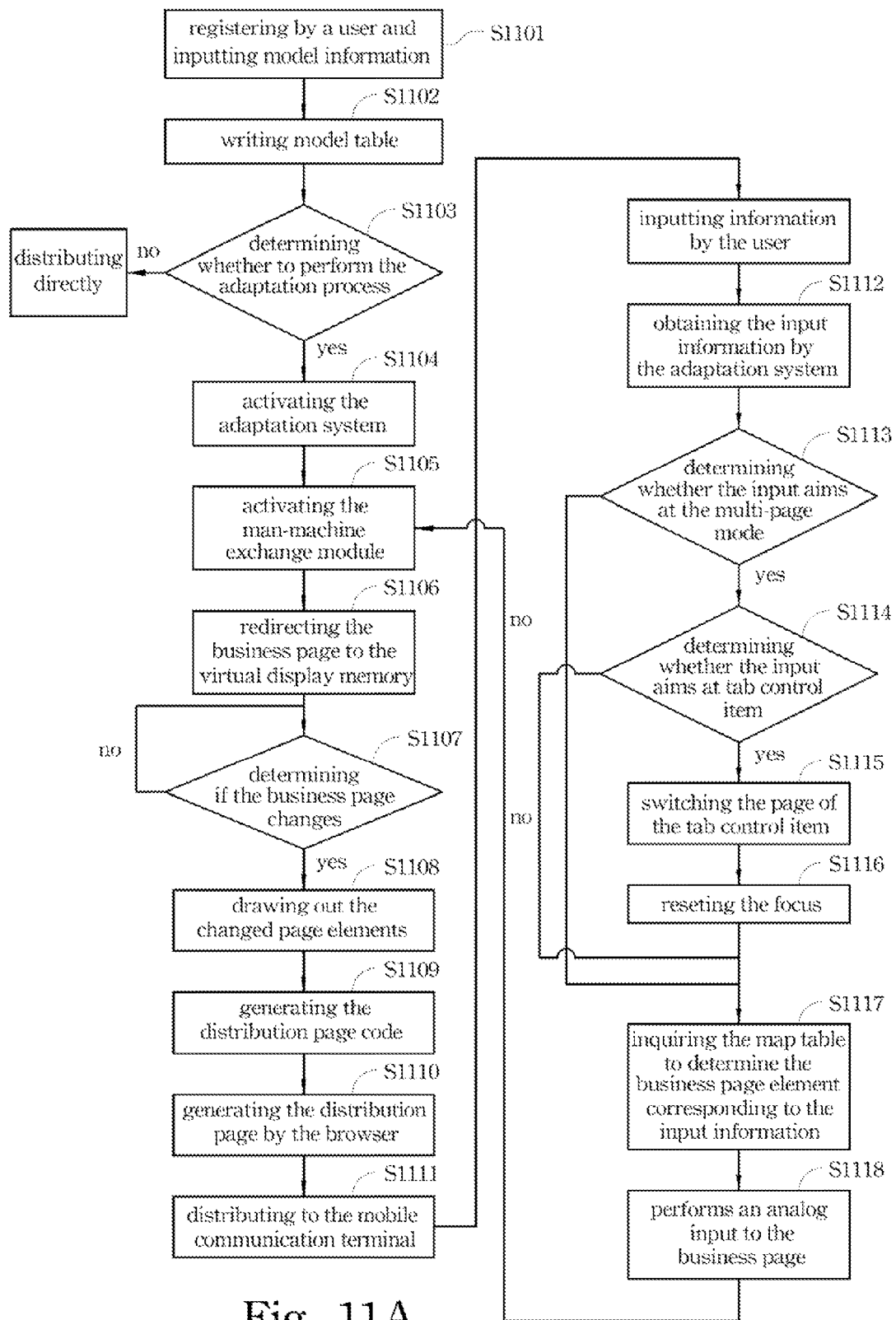

FIG. 11A shows schematically an adaptation flowchart according to one embodiment of the present invention.

For making the output interface of the human-computer interaction module suitable for displaying on the display of the mobile communication terminal so that a user can check, we have to perform an output adaptation process during the distribution process. First, we need to obtain the current display information of the mobile communication terminal 10. In the registration page the portal server 25 distributes to the mobile communication terminal 10, except for the regular authentication information such as a user name, a password, and so on, the mobile communication terminal 10 ask for the model and/or the specification of the display, or other display information when the user registers on the distribution platform 20 through the mobile communication terminal 10. Furthermore, the portal server 25 can distribute an option of whether to perform the terminal screen adaptation process (step 1101).

After the user registers successfully through the authentication process, the portal server 25 inquires the model table 2100 to determine whether the model information that the user registers last time exists. The model table 2100 stores in one shared memory, the hard disc of the portal server 25 or the distribution server 50, or the disk array or the memory of the distribution platform 20 on condition that all servers of the distribution platform 20 can access the model table 2100. If the model information that the user registers last time in the model table 2100 inquired by the portal server 25 is not equal to the information inputted by the user this time, the user will be asked to go through the authentication process, and the confirmed model information by the user will be wrote in the model table 2100 to cover the record the user registers last time. If the portal server 25 doesn't find the model information that the user registers last time in the model table 2100, the model information inputted by the user will be wrote in the model table 2100 directly (step 1102).

The user registers and selects the application system corresponding to the human-computer interaction module 22 to activate VCP protocol and establish a virtual channel between the virtual agent module and the virtual channel module 21. At the same time, the output processor 291 inquires the model table 2100, the output processor 291 obtains the module and the display specification of the mobile communication terminal 10, and the output processor 291 determines whether to perform the adaptation process (step 1103). If the size of the display is bigger such as 640×480, 800×600 or more, and the user choose not to go through the adaptation process, the system can operate by way of distributing directly without activating the adaptation system 2000.

If the output processor 291 inquires the model table 2100 and finds that the display specification of the communication terminal 10 is smaller or the user selects to go through the adaptation process, the adaptation system 2000 will be activated (step 1104). After the adaptation system 2000 is activated, the output processor 291 takes control of the human-computer interaction module 22. The adaptation management device 2001 activates the human-computer interaction module 22 (step 1105). The adaptation management device 2001 redirects the display page (business page 2030) outputted by itself to the virtual display memory 2961 (step 1106). Each element of the original business page can be obtained through the virtual display memory 2961.

The updating monitor 2951 monitors the change of the business page 2030 in the virtual display memory 2961 at all time (step 1107). As long as the change occurs, the change portion will be informed to the extractor 2981. The extractor 2981 draws out the changed page elements and its detailed information of the business page 2030 from the virtual display memory 2961 and sends them to the page generator 2010 (step 1108).

Before the distribution page code 2032 is generated, the page generator 2010 learns the display specification of the mobile communication terminal 10 through inquiring the model table 2100. The page generator 2010 generates the adapted distribution page code 2032 according to the display specification of the mobile communication terminal 10 and the changed page elements of the business page 2030 sent by the extractor 2981 (step 1109). The specific page generating process of the page generator 2010 will be shown bellow. The distribution page code 2032 is html format document or other format document that the browser 221 can interpret. The distribution page code 2032 can generate the distribution page 2031 on the browser 221 (step 1110).

The page generator 2010 updates the map table 2200 when generating the distribution page code 2032. The map table 2200 maintains the page element of the distribution page 2031 structured by the distribution page code 2032, the page element information of the business page 2030, and the corresponding relation between the two. These information and the corresponding relation comprises a name of the control item, a control code, style, size, position, and status.

The page generator 2010 sends the generated distribution page code 2032 to the web service module 2035. The web service module 2035 is the service that the operating system can provide on its own or we can use other software to provide. For example, we can use the IIS of Windows system, or other products such as BEA Weblogic Server, tomcat, apache, and so on.

In fact, the distribution page code 2032 is extremely simple, and there is only one page, one html document without a link, a handling process, an interactive relation, and a background process. Therefore, the browser 221 can display the distribution page 2031 properly without the web module 2035 normally. The page generator 2010 only has to store the generated distribution page code 2032 document in a predetermined storage region.

The browser 221 obtains the distribution page code 2032 from the web service module 2035 or a predetermined storage region and displays it to become the distribution page 2031 according to a regular time period. The distribution page 2031 is distributed to the mobile communication terminal according to the previous described distribution step (step 1111). So far the method of adapting the business page 2030 generated by human-computer interaction module 22 to the distribution page 2031 which is suitable for the mobile communication terminal 10 to display is finished.

The page generator 2010 can satisfy the adaptation process provided by the adaptation system 2000. For the mobile communication terminal to which needs to be performed an adaptation process, the page generator 2010 provides two different adaptation modes according to the difference of the business pages. The two different adaptation modes is a simple mode and a multi-page mode, and they can set up the adaptation system according to their need.

The simple mode is suitable for WEB page which is composed of simple static page element.

Figure 11B:
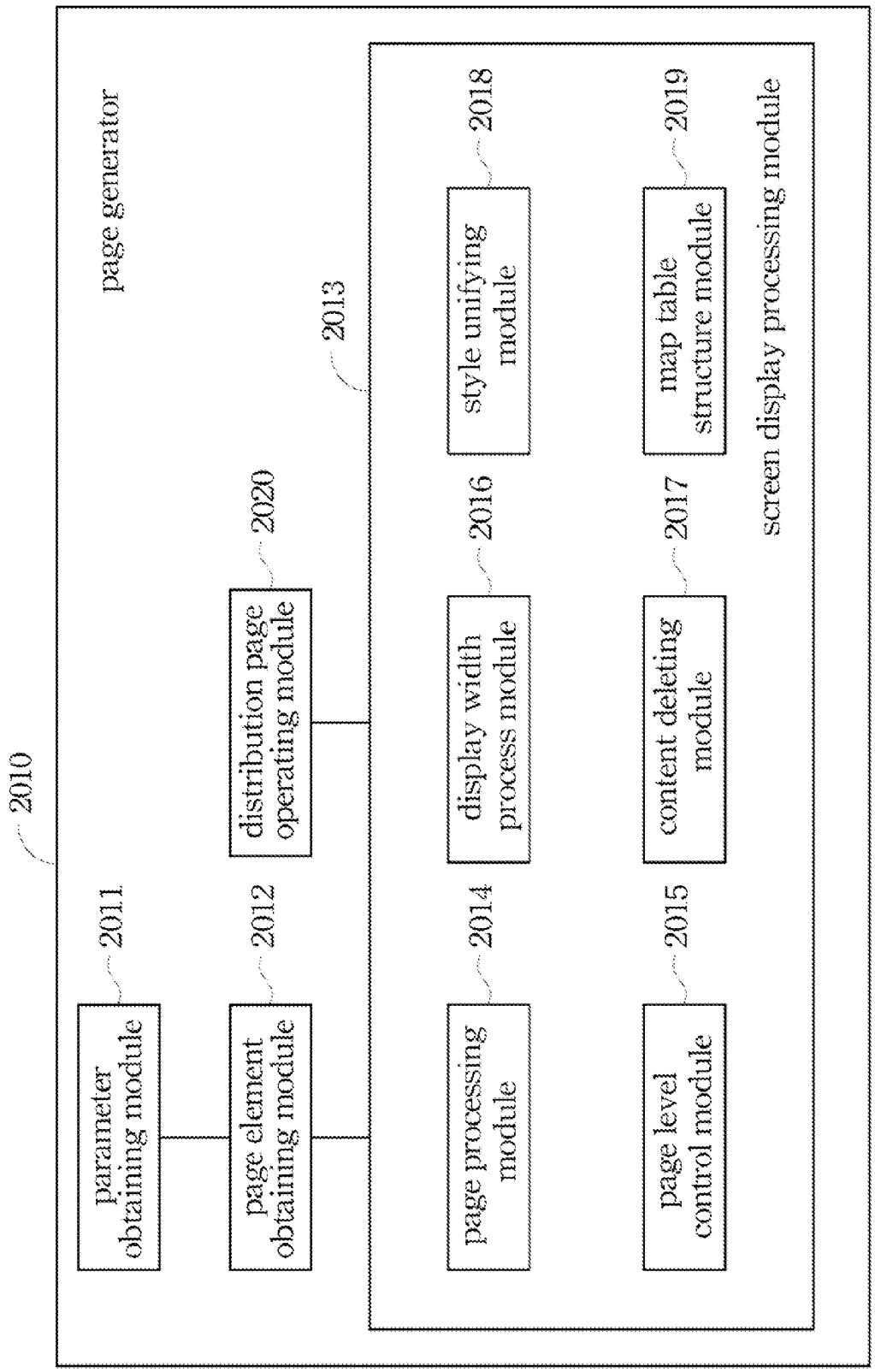

Please refer to FIG. 11B, the page generator 2010 further comprises a parameter obtaining module 2011 for obtaining a menu, a toolbar, a status bar, and a border of a browser and a browser window control code.

The operating for obtaining the control code can be achieved by an api function provided by the operating system. The api function is, for example, an enumwindows function of Window system. The operating for obtaining the setting information of the browser can be achieved by an api function provided by the operating system.

The page generator 2010 further comprises a page element obtaining module 2012. The page element obtaining module 2012 can obtain all page elements in the browser window by using the api function or a control item of all sorts of operating systems. The control item is, for example, a webbrowser control item of Window system.

After finding all page elements, we can use the control code of these elements to acquire the size and the position of the control item by using the GetWindowRect.

The most important module of the page generator 2010 is the screen display processing module 2013 for structuring the distribution page corresponding to the business page according to the obtained page elements. The content of the distribution page is basically similar to the content of the business page, but the page elements is adjusted according to the size of the mobile communication terminal screen to make each page display element match the screen of the mobile communication terminal. For example, the mobile communication terminal displays the page whose width doesn't exceed the width of the mobile communication terminal but displays the page whose length exceed the length of the mobile communication terminal. In this embodiment, a user only has to slide the reel in vertical direction.

The screen display processing module 2013 further comprises the page processing module 2014. For longer text, the page processing module 2014 performs a line feed process to the longer text according to the size of the mobile communication terminal. For bigger font size, the page processing module 2014 reduces the font size.

For the text box which exceeds the screen field, the page processing module 2014 reduces the size of the text box to fit the biggest size of the screen. For the text box which doesn't exceed the screen field, the page processing module 2014 do nothing.

For the button group at the same height, the size of the button will be reduced to arrange them at the same height. If the buttons can't be arranged at the same row, the page processing module 2014 performs a line feed process to the buttons.

For the drop-down list, the wireless button, and so on, the page processing module 2014 reduces their size.

For the menu, if it exceeds the width of the screen, the page processing module 2014 performs a line feed process to the menu.

For the picture, if it exceeds the width of the screen, the page processing module 2014 scales down the size of the picture to fit the size of the screen width, or the page processing module 2014 uses the original size of the picture. For other page elements, if there is no scripting event handlers, other page elements can be ignored and not to display, or other page elements can be display according to the relative place to other elements.

All elements arrange from top to bottom and from left to right, if one column can't display all elements, the page processing module 2014 performs a line feed process to the elements.

The distribution page is a dummy page, which only displays output but doesn't allow a user to input. Consequently, all logics in the page such as a handling process, an event respond, a link, an active relation, and so on, may be deleted, and only the portion which can be displayed may be saved. The data base link, the public function document and the public script using in the page, and the page invokes of other none this application can be all deleted.

The screen display process module 2013 further comprises the page level control module 2015 for setting the mobile application front page to be the first class page, and it is better to set the connecting page to be the third class but no more than fourth class.

For the information browse function, the second class page displays the information list, the third class page displays the detailed information, and there is a return link on the top of the second class page to connect to the mobile application front page.

For the information search function, the second class page is the information search condition page, the third class page is the information list page, the fourth class page is the detailed information page, there is a return link on the top of the third class page to connect to the information search condition page, and there is a return link on the top of the second class page to connect to the mobile application front page For the information list page, if the page has a flip control item, it is better that each page has 3 to 5 display information bar for all information to display on one screen without sliding the reel.

The screen display process module 2013 further comprises the width process module 2016 for regulating the width of the page according to the size of the display width, that is, the display width of the page all use the assigned percentage to minimize the slide rate during the operating of the mobile communication terminal 10 in horizontal direction, and the best of the slide rate is 0.

The screen display process module 2013 further comprises the content deleting module 2017 for deleting the content such as a picture, an anime, and a scroll subtitle of the business page, and only the word information may be save. For the need of the style, we can use a few pictures. In this way, we can assure to display the most useful information in a limited space and increase loading speed of the information.

The screen display process module 2013 further comprises the style unifying module 2018 for managing the whole style of the mobile applications uniformly without using the style of the original system.

For WEB page:

The title of the original application system is assigned in the <title> of the page.

The top margin, the bottom margin, the left margin, and the right margin of the main body in the page is set to be 0, that is, <body topmargin=0 leftmargin=0 rightmargin=0 marginheight=0>. In this way, we can assure that we make the full use of the display space of the screen.

In the top of the page, the left assigns the name of the function point, the font size<font size=3>, and the background color.

Don't a large-area background color in the page.

The size of the font in the page: <font size=2>.

The business page is processed by the page generator 2010 for structuring a distribution page to give it to the web service and store it in one storage position so that the browser can use it.

The screen display process module 2013 further comprises the map table structure module 2019. The map table structure module 2019 structures an original business page and a map table of the renew distribution page. The map table of the renew distribution page maintains the relation between all page elements of the two pages, the position information of the page elements, and the current status.

The page generator 2010 further comprises the distribution page operating module 2020. The distribution page operating module 2020 performs an operating process to the structured distribution page.

The adaptation system open a new IE browser when a user first open the page. The IE browser is the window which will be sent to the mobile communication terminal in the end and the IE browser will be redirected to the virtual display memory 296. If this page has been opened, it won't be opened again.

The feature settings of IE browser is as follow:

The size of the window is set according to the display of the mobile communication terminal. The width of the border is 0. The size can't change. Other feature settings are set according to the application browser.

The target of the browser points to URL of the distribution page, and the browser displays the distribution page at the same time.

At present, the adaptation operating is over. The output processing module of the platform obtains the display content of the distribution page and distributes it to the mobile communication terminal.

The multi-page mode is suitable for WEB page with complex and dynamic page element or none BIS application. The multi-page mode is similar to the simple mode essentially, and the difference is shown below.

Except for using the parameter obtaining module 2011 to obtain the control code, we also need to determine whether the business window is the IE browser window, and we can use api function, for example, getclassname, to achieve.

At the same time, if the business window is the IE browser window, we use the simple mode. If the business window is other window, we do nothing.

If the business window is the browser window when we use page element obtaining module 2012 to obtain the page elements, we use the simple mode.

If the business window is other window, we use api function such as FindWindow and FindWindowEx to obtain the control code of the control item and use GetWindowRect to obtain the size and the position of the control item.

We use screen display process module 2013 to generate the distribution page, and the operating mode we use here is the same as the simple mode. Owing to the complex and the large information volume of the page processed by the multi-page mode, if we make it adapted to the width of the screen, the length of the page will become very long so that the page is not convenient to be used. The adaptation system uses page process module 2014 to structure a paging control item (tab control item) for the large-sized business page. The large-sized page is decomposed into several tab pages, and the length of each tab page is not longer than n times of the length of the mobile communication terminal screen (n can be defined by the user). When we switch the tab pages, there is a movement of switching page generating on the distribution page, and the focus change on the distribution page generated by the switching page is sent to the business page synchronously For none IE browser page, for example, the window page generated by the user terminal software, we transform none IE page into IE page using the way which is similar to the IE page. The difference is that the way of handling the IE page doesn't need a structure menu, a title bar, but the way of handling none IE page needs all page elements to be s structured.

The steps of the structured page map table are, similar to the simple mode. For the operating of the distribution page, we use the mode of IE browser which is similar to the simple mode. For none IE business page, we use window open function when we open the IE business to set the appearance of the IE browser as follow:

There is no title bar, function bar, tool bar, address bar, status bar, the width of the window frame is 0, the width of the window is set according to the width of the mobile communication terminal display, the length of the window is n times of the display, the size can't change, and the target of the browser points to URL of the distribution page, and the browser displays the distribution page at the same time.

The adaptation process will be described in detailed as follow, please refer to FIG. 11A. The adaptation process comprises the steps of:

The information is inputted into the input simulator 191 (step 1112). The input simulator 191 sends the input information to the input mapping device 1911 of the adaptation system 2000, and the input mapping device 1911 inquires the map table 2200 to determine whether the input aims at the multi-page mode (step 1113) or whether the input aims at tab control item (step 1114).

If the input aims at the input of the tab control in the multi-page mode, the input mapping device 1911 performs an analog input process to the browser 221 to finish the operating of the tab control item switching page (step 1115).

The movement of tab control item switching page always brings about the change of the page focus on the distribution page 2031. The focus of the business page 2030 needs to be reset so as to unify the distribution page 2031 and the business page 2030 (step 1116).

For the input of single-page page element of the multi-page page focus resetting, the input mapping device 1911 find input information corresponding to the page element of the distribution page 2031 according to the input position, the current focus of the distribution page 2031, and the input mapping device 1911 inquires the map table 2200 to find the relative page element of the business page 2030 (step 1117). The input mapping device 1911 then performs an analog input to the page element of the business page 2030 (step 1118).

So far, the user inputs the input information of the mobile communication terminal 10 to the business page 2030 to finish the adaptation process. The input of the user always brings about the updating of the business page 2030 of the human-computer interaction module 22. When the updating monitor 2951 detects the updating, proceeding to step 1105.

(5) Screen Operating Portion

As mentioned in (4) Adaptation portion, there is a great difficulty for a user to read or operate when the application interface of PC displays on a small screen, namely the mobile communication terminal screen. Consequently, the adaptation method we use in the business page can solve the problem of the reading experience of a user. Other way to solve this problem is that the screen display range of the mobile communication terminal can be changed. That is to say, the limited screen range of the mobile communication terminal can display different part of the display application interface to make the user acquire the whole application interface in turn according to display operating of the user.

Figure 14:
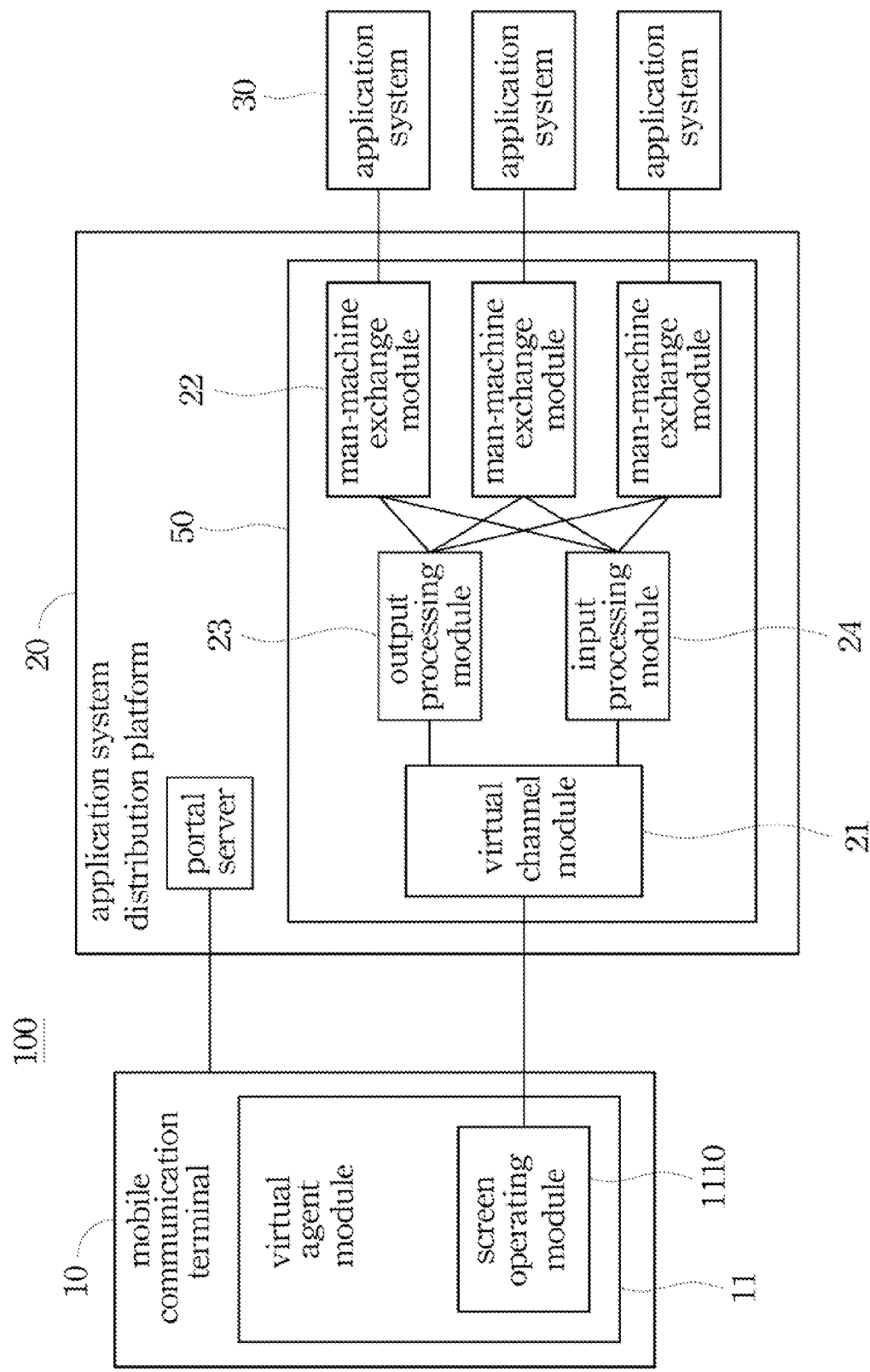
FIG. 14 shows schematically a structure of a distribution system according to another embodiment of the present invention.

FIG. 14 shows schematically a structure of a distribution system according to another embodiment of the present invention. The virtual agent module 11 further comprises the screen operating module 1110 for satisfying the screen operating to make a user browses the different part of the application interface without performing an adaptation process to the application system, that is, the distribution platform doesn't comprises an adaptation system.

Figure 15:
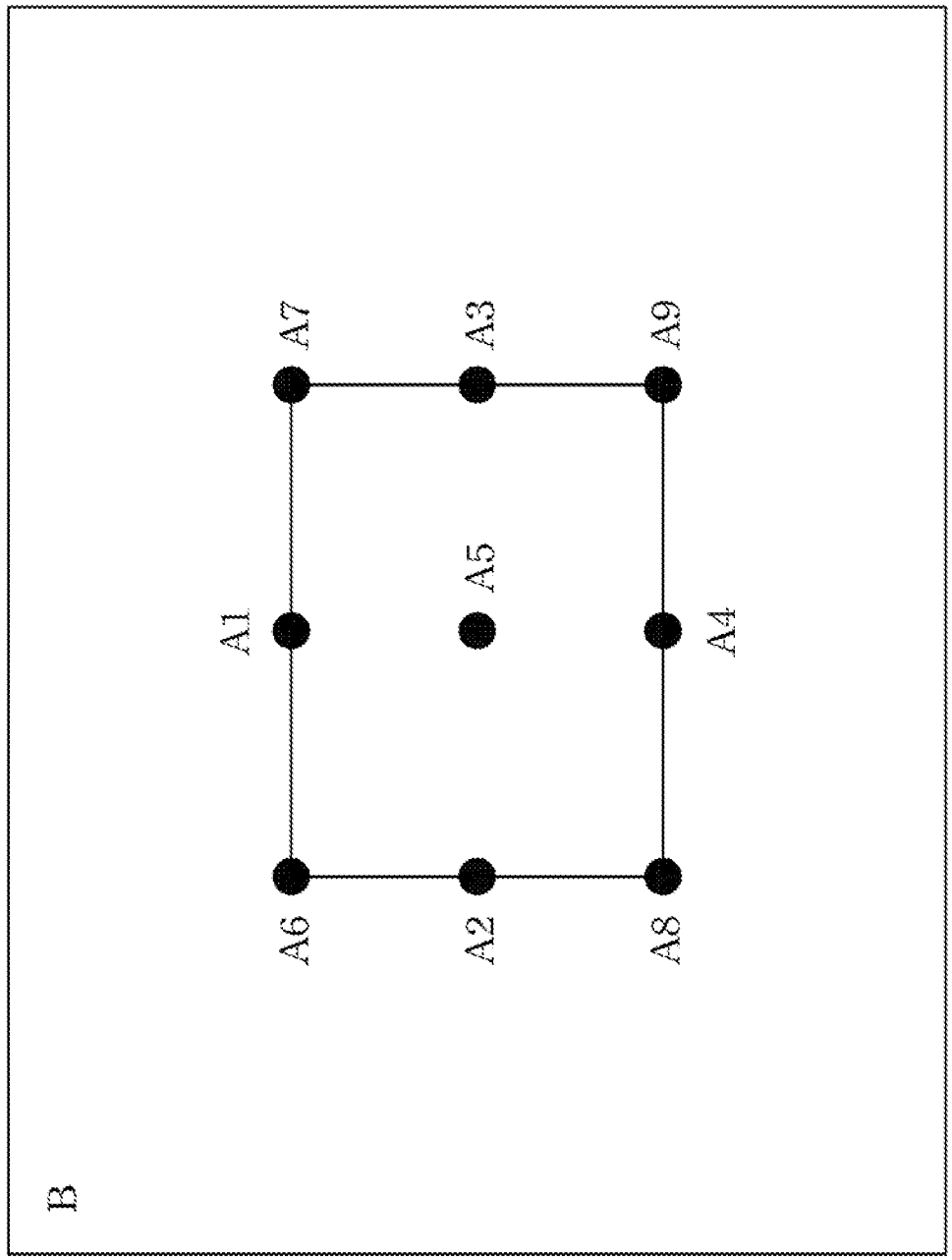
FIG. 15 shows schematically a relation between application interface and a terminal window according to one embodiment of the present invention.

For a complete application system, the size may be bigger such as 800×600 or 1024×768. The size of the mobile communication terminal screen can only display part of the application interface. The present display part of the mobile communication terminal screen is called "terminal window". FIG. 15 shows schematically a relation between application interface B and a terminal window According to one embodiment of the present invention.

When the mobile communication terminal 10 receives the business page sent from distribution platform 20 to display on the screen of the mobile communication terminal 10 through the virtual agent module 11, the screen operating module 1110 displays a switch button in a specific region so that the user can use the switch button to control the button of the display operating function.

If the screen operating function is off, a user can only use the four directions button to move the window. If the screen operating function is on, a user can use the screen operating module 1110 to control the display application interface. The screen operating module 1110 supports a window mode and an abbreviation mode, and we can switch between two modes through quick operating. The abbreviation mode is used for generating the thumbnail of whole application interface, and the size of the thumbnail is the same as the size of the terminal window. The user can see the screen to know the whole efficiency of the application interface. The window mode is used for generating the page efficiency which is adapted to a user to view, so it can only display part of the application interface. The window mode also provides a convenience adjusting way to move the current display window.

When a user activates the screen operating function through clicking the switch button, the screen operating module 1110 can acquiesce for entering the abbreviation mode or entering the window mode. The list is displayed for a user to select to conform the current mode.

In the abbreviation mode, the thumbnail of the application interface completely displays on the terminal window, and any input of a user is recognized as a screen operating input without sending it to the distribution platform. When the user clicks at a position in the thumbnail, the mode will be switch to the window mode. The terminal window then displays part of the application interface in normal ratio, and the terminal window will move to the position which uses the location the user clicks as its center point. When the user clicks twice at the thumbnail, the mode will be switch to the window mode. The terminal window then displays part of the application interface in normal ratio, and the terminal window move to the original place where the terminal window belong before the terminal window enters the abbreviation mode.

In the window mode, the terminal window displays part of the application interface in normal ratio. In this mode, some information the user inputs is used as a screen operating instruction, and this input information and the instruction is as follow:

When a user uses a point pen and mouse to drag and drop on the screen, the drag-drop instruction will be sent immediately to drag the terminal window for displaying the different parts of the application interface.

In addition, a quick point is displayed in an important geometric position on the screen, and the typical distribution mode of the quick point A1-A9 is shown in FIG. 15. The geometric position of the quick point in the terminal window represents the geometric position on the application interface.

A user can click the quick point to achieve some particular operating, for example, a quick jump function. When a user uses the left button of the mobile communication terminal or the point pen click once at the quick point in some position, the quick jump instruction will be sent, and the terminal window jump to the corresponding position on the application interface directly. For example, when a user clicks the quick point A5 at the geometric center of the screen, the terminal window will jump to a center position which uses the geometric center of the application interface as its center.

For a straight jump function, a user operates the quick points A1-A4 at middle point of the four sides of the terminal window, that is, the straight jump instruction will be sent, to make the terminal window straightly jumps from the present position to the edge position of the application interface. For example, when we double click the quick point A3 at the middle of the right border of the terminal window, the terminal window can jump from the present position to the rightmost of the application interface in horizontal direction. When we double click the quick point A6 at the left top point of the terminal window, the terminal window can jump from the present position to the left top point of the application interface in horizontal direction.

For a straight move function, we operate the quick points A1-A4 at middle point of the four sides of the terminal window, that is, the straight move instruction will be sent, to make the terminal window straightly moves from the present position to the edge position of the application interface. For example, when we double click the quick point A3 at the middle of the right border of the terminal window, the terminal window can slowly move from the present position to the rightmost of the application interface in horizontal direction, and the user can read the content rolling on the window during the moving process For a reading function, we operates one of the quick points such as pushing the quick point for a long time, that is, the reading instruction will be sent, to make the present terminal window slowly move from left to right and from top to button for the user to read a longer article.

For an assigned point and viewing frame function, we operate one of the quick points such as clicking the dialing button to display the assigned point and the viewing frame on the screen. The position of the terminal window in which the assigned point and the viewing frame are is similar to the position of the application interface in which the present terminal window is.

The embodiment of the operating instruction as mention above can be many such as clicking the number button one, clicking the camera button, clicking the conforming button, and so on. In other embodiment of the present invention, the present invention can comprises one or more above mention operating functions.

In the window mode, the screen operating module 1110 intercepts the mouse/keyboard input information of a user and analyzes it. If the analyzed input information is one of the above instructions in the window mode, the instruction can be performed on the mobile communication terminal, and the input information won't be sent to the distribution platform. For other input information, it may also be sent to the distribution platform.

Figure 16:
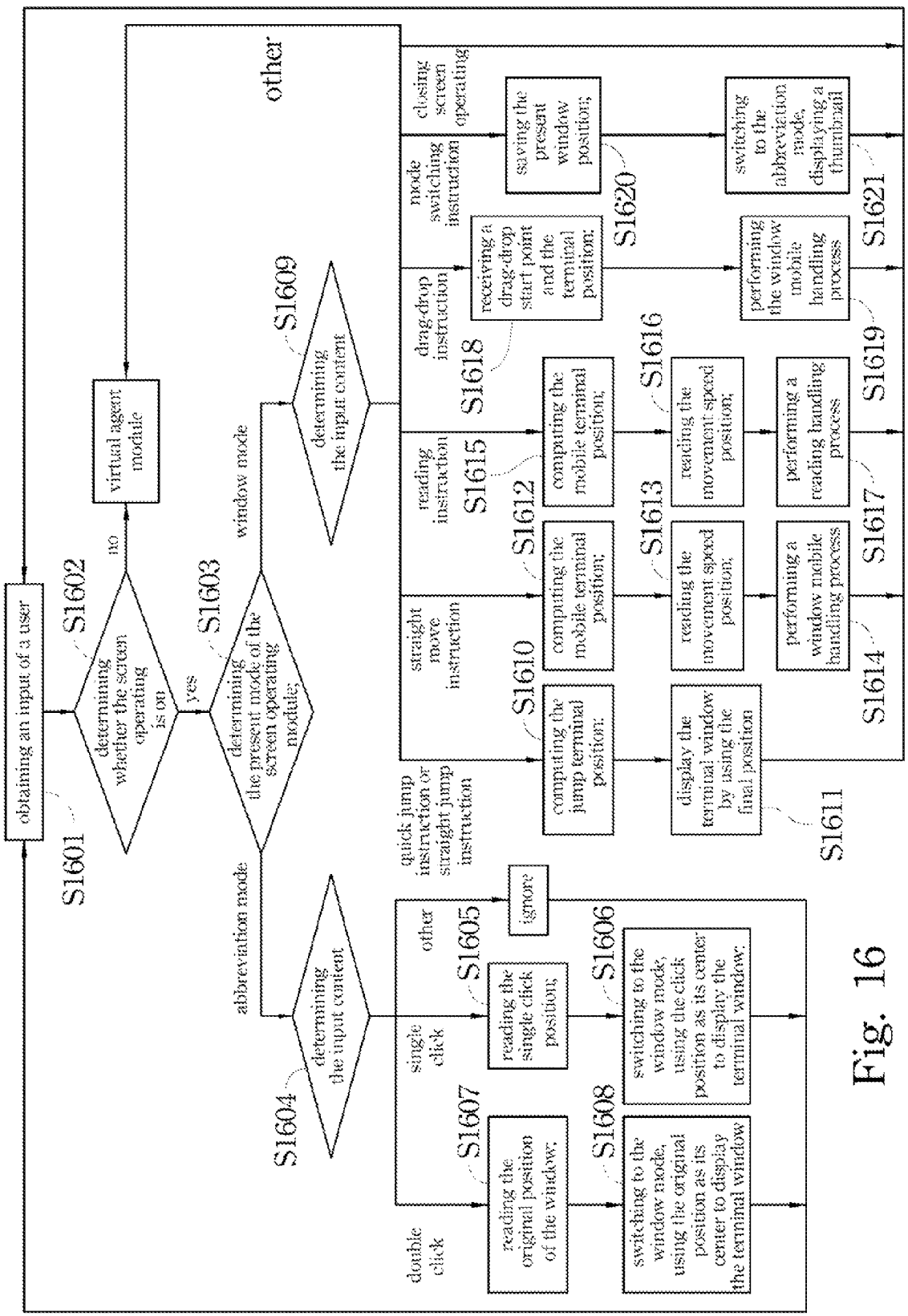
FIG. 16 shows schematically a logical operating flowchart of a screen operating module according to one embodiment of the present invention.

FIG. 16 shows schematically a logical operating flowchart of a screen operating module 1110 according to one embodiment of the present invention. The logical operating flowchart comprises the steps of:

Step 1601, obtaining an operating of a user by the mobile communication terminal;

Step 1602, determining whether the screen operating function is on by the screen operating module 1110, if the screen operating function is on, proceeding to Step 1603; if the screen operating function is off, performing the corresponding operating by the virtual agent module 11;

Step 1603, determining the present mode of the screen operating module 1110, if the present mode is the abbreviation mode, proceeding to Step 1604; if the present mode is window mode, proceeding to Step 1609;

Step 1604, further detecting and determining the operating content of the user, if the operating is single click, proceeding to Step 1605; if the operating is double click, proceeding to Step 1607; if the operating is other type of operating, ignoring it and proceeding to Step 1601;

Step 1605, reading the click position;

Step 1606, switching to the window mode, using the click position as its center to display the terminal window, proceeding to Step 1601;

Step 1607, reading the original position of the window;

Step 1608, switching to the window mode, using the original position as its center to display the terminal window, proceeding to Step 1601;

Step 1609, detecting and performing an interpret process to the operating content of a user, if the operating content is the quick jump instruction or the straightly jump instruction, proceeding to Step 1610; if the operating content is a straightly move instruction, proceeding to Step 1612; if the operating content is a reading instruction, proceeding to Step 1615; if the operating content is a drag-drop instruction, proceeding to Step 1618; if the operating content is a mode switching instruction, proceeding to Step 1621; if the operating content is an instruction to close the screen operating function, proceeding to Step 1601; if the operating content is other instruction, performing a corresponding operating by the virtual agent module 11;

Step 1610, computing the jump terminal position;

Step 1611, display the terminal window by using the final position, and proceeding to Step 1601;

Step 1612, computing the mobile terminal position;

Step 1613, reading the movement speed parameter;

Step 1614, performing a window mobile handling process in the conventional technology, and moving the present display window to the final position smoothly, and proceeding to Step 1601;

Step 1615, computing the mobile terminal position;

Step 1616, reading the movement speed parameter;

Step 1617, performing a reading handling process in the conventional technology, and proceeding to Step 1601;

Step 1618, receiving a drag-drop start point and the terminal position;

Step 1619, performing the window mobile handling process in the conventional technology, the present display window is dragged to the terminal position, and proceeding to Step 1601;

Step 1620, saving the present window position;

Step 1621, switching to the abbreviation mode, displaying a thumbnail, and proceeding to Step 1601.

(6) Operating Portion

Figure 12:
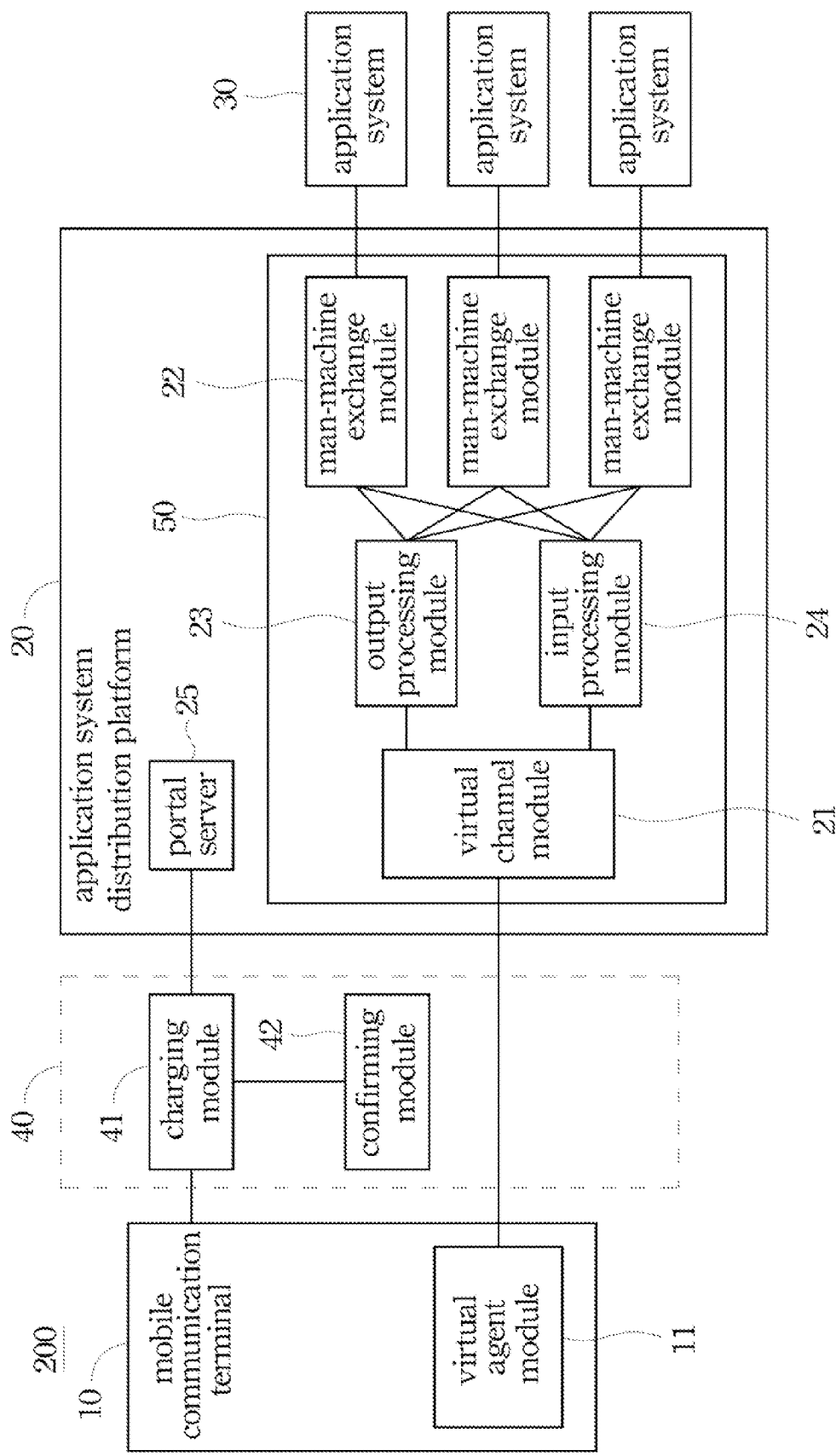
FIG. 12 shows schematically an integrated structure of an application system distribution operating system according to one embodiment of the present invention.

We can make the application system distribution platform satisfy the business operating of the industry through an operating system of an application system distribution to so as to provide a commerce distribution service of a mobile application system for a marketizing operating. FIG. 12 shows schematically an integrated structure of an application system distribution operating system according to one embodiment of the present invention.

The mobile communication terminal 10 is connected to the application system distribution platform through the operating device 40. The mobile communication terminal 10 can receive the information of the application system 30 the distribution platform distributes and send input information. The operating device 40 takes the task that provides basic mobile network connection service, and the operating device 40 is also used to charge the application system distribution service.

The operating device 40 is the mobile communication service network of the mobile communication operating management comprising a regulate module in the present technology such as a base station, a mobile communication switching center, and so on. In addition, the operating device 40 further comprises a charging module 41 for charging the operating of distributing the application system information by the application system distribution platform. The charging mode of the charging module 41 comprises a charging by the flow, a charging by the using time, a charging by the amount of the application distribution, a charging by the number of the user, a charging by the amount and/or style of the application distribution, a charging by the adaptation condition of the terminal screen, a charging by month, year, flow, a set of the using time, or a charging by one or more of the above strategies. The mobile communication operator distributes the charging expense to the platform operator who develops and maintains the application system distribution platform after the mobile communication operator receives the expense.

Figure 13:
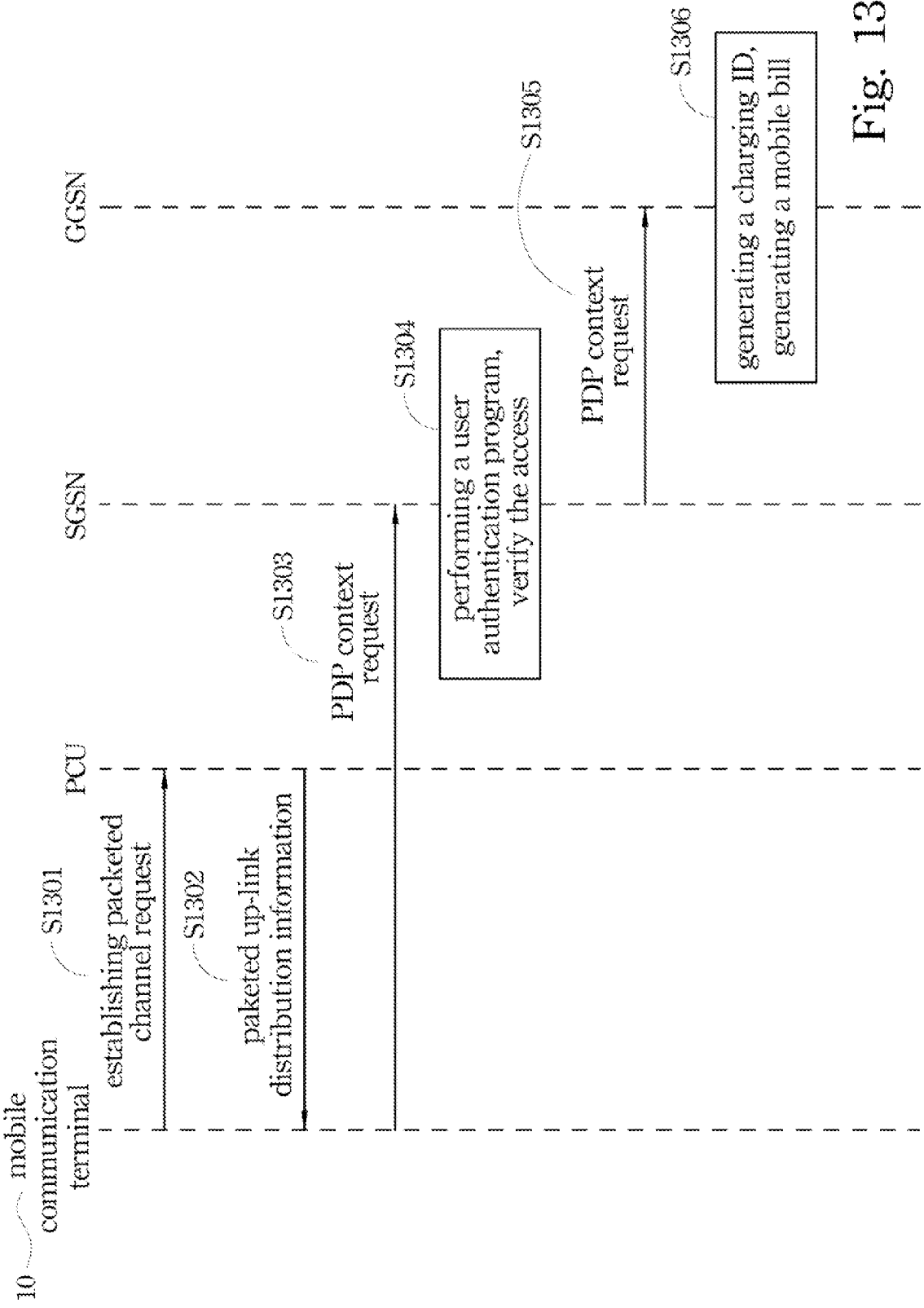
FIG. 13 shows schematically a charge flowchart according to one embodiment of the present invention.

The charging step of the charging module can use the current charging method of the telecommunication operator. Take the case of GPRS, the charging module performs a charging method according to the flow when the mobile communication terminal 10 start to establish a connection with the distribution platform 20. FIG. 13 shows schematically a charge flowchart according to one embodiment of the present invention. The charge flowchart comprises the steps of:

Step 1301, sending a request of establishing packeted channel to PCU (packet control unit) by the mobile communication terminal when a user open a web browser;

Step 1302, distributing the link resource of the mobile communication terminal and resuming packeted up-link distribution information by the PCU;

Step 1303, activating PDP context request, to initiate packeted information business call and sending it to SGSN (GPRS business node) after the mobile communication terminal receives the packeted up-link distribution information;

Step 1304, performing a user authentication program by SGSN to verify the access of the user;

Step 1305, sending the PDP context request to GGSN (gateway GPRS support node) by SGSN for the authorized user;

Step 1306, generating a charging ID, a mobile bill and starting to charge for the mobile communication terminal by GGSN.

Every time the mobile communication terminal 10 uses the mobile information network to connect with the distribution platform 20, the mobile information network uses the above communication control method to control and record the flow of the mobile communication terminal 10 particularly and specifically.

The operating system 200 as mention above further comprises a conforming module 42 for performing a conforming process before the charging step is performed. The conforming process can be achieved by cooperating with the mobile communication terminal or the operating center of the mobile communication operator. For example, the enterprise user can go to the operating center of the mobile communication operator to regulate the service of the application system distribution and negotiate the charging standard with the telecommunication operator for conforming the activation of the distribution service. The step 201, more particularly, the step 301 further comprises: sending the connecting request to the portal server 25 by the mobile communication terminal 10 and receiving the connecting request by the operating device 40 to send a distribution service charging conforming information to the mobile communication terminal 10. The distribution service charging conforming information comprises the charging mode and price of the present distribution service and selecting buttons of accepting or abandoning. The operating device 40 sends the connecting request to the portal server 25 when the mobile communication terminal 10 replies that it accepts the charging mode.

The disposition of the distribution platform comprises a separating disposition mode and a centralizing disposition mode.

In separating disposition mode of the system, for each of the business users, the distribution platform is disposed in the information center of the enterprise near the enterprise application system to be distribution.

The characteristic of the separating disposition mode is that distribution platform is distributed to each enterprise. The advantage of the separating disposition mode is as follow: near the enterprise application, the platform and the application system is connected to each other by a local area network, good quality of the network, high efficiency of the system operating. If the distribution platform is belong to only one enterprise, the confluent between the platform and application system is better so that the system operating efficiency is higher. In the initial stage of the business development, the function and the scope of the platform can be regulated according to the condition of the user, and the investment is lower. All the enterprises and applications are operating in the internal network, so the safety is high.

The disadvantage of the separating disposition mode is as follow: If the distribution platform is belonged to only one enterprise, the resource can be shared to generate some idle resource so that the synthetic investment is high. The platform operator management is not convenience, so the management cost is higher. If the enterprise wants to perform a national or global large-scale disposition, the investment is high. The individuation is high, so the business normalization of the operator is different. The business disposition time if longer, a fast disposition business of the operator is different.

In the centralizing disposition mode, the distribution platform 25 is disposed in the motor room of the platform operator or the telecommunication operator. The IT application system of all enterprise users is connected to the distribution platform of the platform operator or the telecommunication operator through the network. The platform operator or the telecommunication operator then distributes to the mobile communication terminal through the mobile communication network. The platform operator can manage the platform conveniently.

The characteristic of the centralizing disposition mode is that the distribution platform centralizing disposes in the place of the platform operator or the telecommunication operator. The advantage of the centralizing disposition mode is as follow:

The centralizing disposition of the platform can be achieve, so it is convenience for an operator to manage so that the management cost is lower. The whole platform is shared among the enterprise user, it can perform statistical multiplexing process easily so that the business payment cycle is short and the operator can dispose the business faster.

The disadvantage of the centralizing disposition mode is as follow: If the platform and the enterprise apply a inter-city disposition and use the wide area network as their connection, the network quality is lower, and the system operating efficiency is lower. The distribution platform is belonged to all enterprises, so the confluent between the platform and application system is lower, and the system operating efficiency is lower. The enterprise data need to provide the internal network, so the safety is lower. In the initial stage of the business development, the structure cost is higher.

The present invention uses virtualization technology without really installing the application system in the mobile communication terminal; however, the present invention installs software on the platform and merely performs an abstraction process to the interface. In this way, the mobile communication terminal with lower processing ability can assess one application through mobile communication network. The seamless application interface transportation brings about more intuitive experience to a user.

The mobile communication terminal display interface of the present invention answers the viewing habits of the user so that the distribution content of the application system is applicable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A distribution method in an application system of a mobile communication network, the mobile communication network comprising a base station and a mobile communication switching center, the method comprising:
   (a) establishing a connection between a mobile communication terminal and an application system distribution platform through the mobile communication network;
   (b) accessing a corresponding application system by activating an application system human-computer interaction module installed on the application system distribution platform;
   (c) operating the application system and the human-computer interaction module;
   (d) obtaining a screen display image interface of the human-computer interaction module by an output processing module of the application system distribution platform and sending the screen display image interface to the mobile communication terminal;
   (e) displaying the screen display image interface by the mobile communication terminal and sending input information to the human-computer interaction module; and
   (f) repeating the step (c) through step (e) until the mobile communication terminal quitting the operation of the application system;
   wherein the step (a) comprises establishing a virtual channel between a virtual agent module of the mobile communication terminal and a virtual channel module of the application system distribution platform for sending the input information of the mobile communication terminal and the screen display image interface.

2. The method according to claim 1, wherein the mobile communication terminal of the step (a) establishes the connection with the application system distribution platform by a wireless communication mode or a quick guide mode.

3. The method according to claim 1, wherein the step (a) further comprises:
   (1) accessing a portal server of the application system distribution platform by the mobile communication terminal;
   (2) performing a user authentication process and an authorization process to the accessing request of the mobile communication terminal by the portal server and sending the authorized application system list of the mobile communication terminal to the mobile communication terminal;
   (3) selecting an item from the application system list by the mobile communication terminal to activate the corresponding human-computer interaction module.

4. The method according to claim 2, wherein the wireless communication mode comprises a short message, a multimedia message, a wireless application protocol, and a wireless application protocol push.

5. The method according to claim 1, wherein the step A and the step B through E use the same bearer network or different bearer networks.

6. The method according to claim 5, wherein the bearer networks used in the steps B through E comprise a wireless network and a wired network.

7. The method according to claim 1, wherein the mobile communication terminal is a mobile phone, a personal digital assistant, a vehicle terminal, or a computer having a wireless mobile communication accessing module.

8. The method according to claim 1, wherein the step (d) further comprises:
   redirecting the screen display image interface generated by the human-computer interaction module to a predetermined memory by a screen output;
   obtaining a change segment of a content of the memory by an analysis of the output processing module when the content of the memory changes and performing a structured handling in the change segment to make the mobile communication terminal analyzing the change segment; and
   performing a compressing process and sending the screen display image interface to the mobile communication terminal.

9. The method according to claim 1; wherein the step (d) further comprises:
   performing an output adaptation to the screen display image interface, establishing a map table, and generating a distribution page which matches a screen of the mobile communication terminal, wherein the map table is used to record a corresponding relation between the distribution page and a display element of the screen display image interface; and
   the step (e) further comprising:
   performing an input adaptation to the input information.

10. The method according to claim 9, wherein the step (d) further comprises:

decomposing the screen display image interface into a plurality of distribution pages through a paging control item.

11. The method according to claim 9, wherein the step of generating the distribution page further comprises:
   deleting logical control information in the screen display image interface; and/or
   deleting or shrinking the display element in the screen display image interface to make each of the display elements match the screen of the mobile communication terminal according to a screen specification of the mobile communication terminal.

12. The method according to claim 9, wherein the step of performing the input adaptation further comprises:
   confirming the display element in the screen display image interface corresponding to the input information according to the map table.

13. The method according to claim 1, wherein the application system uses C/S architecture, B/S architecture or stand-alone architecture.

14. The method according to claim 1, wherein the step (e) comprises displaying the screen display image interface by the mobile communication terminal through an abbreviate mode or a window mode; wherein the abbreviate mode is a mode of displaying a thumbnail of the screen display image interface on a display device of the mobile communication terminal; and the window mode is a mode of displaying the screen display image interface on part of the display device of the mobile communication terminal according to a browsing range and a browsing mode assigned by a user.

15. The method according to claim 14, wherein the step (e) further comprises:
   computing a jump location by the mobile communication terminal according to a jump instruction sent by the user and displaying the screen display image interface using the jump location as center thereof in the window mode;
   performing a window shifting process by the mobile communication terminal according to a rectilinear motion instruction sent by the user and shifting the present display window smooth to a location assigned by the user;
   performing a reading handling process by the mobile communication terminal according to reading instruction sent by the user; and/or
   performing a window shifting process by the mobile communication terminal according to a drag-drop instruction sent by the user and dragging the present display window of the mobile communication terminal to a location assigned by the user.

16. An application system distribution system for using in a mobile communication network, wherein the mobile communication network comprises a mobile communication terminal, a base station and a mobile communication switching center, and the system comprises a mobile communication terminal, an application system distribution platform, and an application system, wherein the mobile communication terminal establishes a connection with the application system distribution platform through the mobile communication network;
   the mobile communication terminal comprising a virtual agent module, and the application system distribution platform comprising a virtual channel module, an output processing module, an input processing module and a human-computer interaction module;
   the output processing module connected to the virtual channel module and the human-computer interaction module respectively for obtaining a screen display image interface of the human-computer interaction module and sending the screen display image interface to the virtual channel module;
   the input processing module connected to the virtual channel module and the human-computer interaction module respectively for processing an input information obtained from the virtual channel module and transmitting to the human-computer interaction module;
   a virtual channel established between the virtual agent module and the virtual channel module for sending the screen display image interface of the human-computer interaction module and the input information in the mobile communication terminal inputted by the user; and
   the human-computer interaction module connected to the application system, and the mobile communication terminal accessing the corresponding application system by activating the human-computer interaction module and operating the application system.

17. A system according to claim 16, wherein the mobile communication terminal establishes the connection with the application system distribution platform by a wireless communication mode or a quick guide mode.

18. A system according to claim 16, wherein the mobile communication terminal is a mobile phone, a personal digital assistant, a vehicle terminal, or a computer having a wireless connection module.

19. A system according to claim 16, wherein the application system distribution platform further comprises a portal server, the portal server used for performing a user authentication process and an authorization process to the accessing request of the mobile communication terminal by the portal server, and sending the authorized application system list of the mobile communication terminal to the mobile communication terminal.

20. A system according to claim 16, wherein the application system distribution platform further comprises an adaptation module, the adaptation module used for performing an output adaptation to the screen display image interface, establishing a map table and generating a distribution page which matches a screen of the mobile communication terminal, wherein the map table is used to record a corresponding relation between the distribution page and a display element of the screen display image interface, and performing an input adaptation to the input information.

21. A system according to claim 20, wherein the adaptation module decomposes the screen display image interface into a plurality of distribution pages through a paging control item.

22. A system according to claim 20, wherein the adaptation module further comprises:
   a screen display processing module used for deleting logical control information in the screen display image interface according to a screen specification of the mobile communication terminal; and/or adjusting a display parameter of each of display elements to make each of the display elements matches the screen of the mobile communication terminal.

23. A system according to claim 20, wherein the adaptation module further comprises:
   an input map table module for confirming the display element in the screen display image interface corresponding to the input information according to the map table.

24. A system according to claim 16, wherein the application system uses C/S architecture, B/S architecture or stand-alone architecture.

25. A system according to claim 17, wherein the wireless communication mode comprises a short message, a multimedia message, a wireless application protocol, and a wireless application protocol push.

26. A system according to claim 16, wherein the application system distribution platform further comprises a predetermined memory, the screen display image interface generated by the human-computer interaction module redirected to the predetermined memory by a screen output, wherein the output processing module performs an output processing to a changing segment of a content in the memory and sends the changing segment to the virtual channel module.

27. A system according to claim 16, wherein the virtual agent module further comprises a screen operating module for displaying the screen display image interface on the mobile communication terminal through an abbreviate mode or a window mode; wherein the abbreviate mode is a mode of displaying a thumbnail of the screen display image interface on a display device of the mobile communication terminal; and the window mode a mode of displaying the screen display image interface on part of the display device of the mobile communication terminal according to a browsing range and a browsing mode assigned by the user.

28. A system according to claim 27, wherein the screen operating module computes a jump location according to a jump instruction sent by a user and displaying the screen display image interface using the jump location as a center thereof in the window mode;
the screen operating module performing a window shifting process according to a rectilinear motion instruction sent by the user and shifting the present display window of the mobile communication terminal smooth to a location assigned by the user;
the screen operating module performing a reading handling process according to reading instruction sent by the user; and/or
the screen operating module performing a window shifting process according to a drag-drop instruction sent by the user and displaying the screen display image interface using the location assigned by the user as a center thereof.

29. An operating method for application system distribution, wherein the operating method is used in different aspects comprising a mobile communication terminal user and a mobile communication service network of a mobile communication operator, and the operating method comprises:
(a) establishing a connection between the mobile communication terminal user and the an application system distribution platform through the mobile communication operator;
(b) accessing a corresponding application system by activating a human-computer interaction module installed on the application system distribution platform;
(c) operating the application system and the human-computer interaction module;
(d) obtaining a screen display image interface of the human-computer interaction module by a virtual channel module of the application system distribution platform, and a virtual channel is established between the virtual channel module and the a virtual agent module of the mobile communication terminal;
(e) displaying the screen display image interface of the human-computer interaction module by the mobile communication terminal and sending input information of a user to the human-computer interaction module.

30. The method according to claim 29, further comprising:
a charge procedure for charging a distribution of application system information through the application system distribution platform.

31. The method according to claim 30, wherein the charge procedure further comprises confirming an expense of an application system distribution information charged by the mobile communication operator.

32. The method according to claim 31, wherein the step of confirming the expense of the application system distribution information is performed with the mobile communication terminal or an operations center of the mobile communication operator.

33. The method according to claim 29, wherein the step (a) further comprises:
(1) accessing a portal server of the application system distribution platform by the mobile communication terminal;
(2) performing a user authentication process and an authorization process to the accessing request of the mobile communication terminal by the portal server, and sending the authorized application system list of the mobile communication terminal to the mobile communication terminal;
(3) selecting an item from the application system list by the mobile communication terminal to activate the corresponding human-computer interaction module.

34. The method according to claim 29, wherein the step D further comprises:
redirecting the screen display image interface generated by the human-computer interaction module to a predetermined memory by a screen output;
obtaining a change segment of a content of the memory by an analysis of the output processing module when the content of the memory changes and performing a structured handling in the change segment to make the mobile communication terminal analyzing the change segment; and
performing a compressing process and sending the screen display image interface to the mobile communication terminal.

35. The method according to claim 29, wherein the step (d) further comprises:
performing an output adaptation to the screen display image interface, establishing a map table, and generating a distribution page which matches a screen of the mobile communication terminal, wherein the map table is used to record a corresponding relation between the distribution page and a display element of the screen display image interface; and
the step (e) further comprising:
performing an input adaptation to the input information.

36. The method according to claim 35, wherein the step of generating the distribution page further comprises:
deleting logical control information in the screen display image interface; and/or
deleting or shrinking the display element in the screen display image interface to make each of the display elements matches the screen of the mobile communication terminal according to a screen specification of the mobile communication terminal.

37. The method according to claim 35, wherein the step of performing the input adaptation further comprises:
confirming the display element in the screen display image interface corresponding to the input information according to the map table.

38. The method according to claim 29, wherein the mobile communication terminal of the step (a) establishes the connection with the application system distribution platform by a wireless communication mode or a quick guide mode.

39. An operating system of an application system distribution, comprising:
a mobile communication terminal, an application system distribution platform, an application system, and an operating device;
wherein the operating device is a mobile communication service network of a mobile communication operator, which comprises a base station and a mobile communication switching center, and the mobile communication terminal establishes a connection with the application system distribution platform through the operating device;
the mobile communication terminal comprising a virtual agent module, and the application system distribution platform comprising a virtual channel module, an output processing module, an input processing module and a human-computer interaction module;
the output processing module connected to the virtual channel module and the human-computer interaction module respectively for obtaining a screen display image interface of the human-computer interaction module and sending the screen display mage interface to the virtual channel module;
the input processing module connected to the virtual channel module and the human-computer interaction module respectively for processing an input information obtained from the virtual channel module and transmitting to the human-computer interaction module;
a virtual channel established between the virtual agent module and the virtual channel module for sending the screen display image interface of the human-computer interaction module and the input information of the user through the operating device; and
the human-computer interaction module connected to the application system and accessing the corresponding application system by activating the human-computer interaction module and operating the application system.

40. An operating system according to claim 39, wherein the operating device further comprises a charge module for charging a distribution of application system information through the application system distribution platform.

41. An operating system according to claim 40, wherein the charge module further comprises a confirm module for confirming an expense of an application system distribution information charged by the mobile communication operator.

42. An operating system according to claim 41, wherein the confirm module is performed with the mobile communication terminal or an operations center of the mobile communication operator.

43. An operating system according to claim 39, wherein the mobile communication terminal establishes the connection with the application system distribution platform by a wireless communication mode or a quick guide mode.

44. An operating system according to claim 39, wherein the mobile communication terminal is a mobile phone, a personal digital assistant, a vehicle terminal, or a computer having a wireless connection module.

45. An operating system according to claim 39, wherein the application system distribution platform further comprises a portal server, the portal server used for performing a user authentication process and an authorization process to the accessing request of the mobile communication terminal by the portal server, and sending the authorized application system list of the mobile communication terminal to the mobile communication terminal through the operating device.

46. An operating system according to claim 39, wherein the application system distribution platform further comprises an adaptation module, the adaptation module used for performing an output adaptation to the screen display image interface, establishing a map table and generating a distribution page which matches a screen of the mobile communication terminal, wherein the map table is used to record a corresponding relation between the distribution page and a display element of the screen display image interface, and performing the input adaptation to an input information.

47. An operating system according to claim 46, wherein the adaptation module decomposes the screen display image interface into a plurality of distribution pages through a paging control item.

48. An operating system according to claim 46, wherein the adaptation module further comprises:
a screen display processing module used for deleting logical control information in the screen display image interface according to a screen specification of the mobile communication terminal; and/or adjusting a display parameter of each of display elements to make each of the display elements matches the screen of the mobile communication terminal.

49. An operating system according to claim 46, wherein the adaptation module further comprises:
an input map table module for confirming the display element in the screen display image interface corresponding to the input information according to the map table.

50. An operating system according to claim 39, wherein the application system uses C/S architecture, B/S architecture or stand-alone architecture.

51. An operating system according to claim 43, wherein the wireless communication mode comprises a short message, a multimedia message, a wireless application protocol, and a wireless application protocol push.

52. An operating system according to claim 39, wherein the application system distribution platform further comprises a predetermined memory, the screen display image interface generated by the human-computer interaction module redirected to the predetermined memory by a screen output, wherein the output processing module performs an output processing to a changing segment of a content in the memory and sends the changing segment to the virtual channel module.

* * * * *